United States Patent
Stavridis et al.

(10) Patent No.: US 12,308,881 B2
(45) Date of Patent: May 20, 2025

(54) LIGHT-COMMUNICATION BASED CONTROL OF RADIO TRANSMISSIONS

(71) Applicant: Telefonaktiebolaget LM Ericsson (publ), Stockholm (SE)

(72) Inventors: Athanasios Stavridis, Malmö (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 18/034,525

(22) PCT Filed: Oct. 30, 2020

(86) PCT No.: PCT/EP2020/080586
§ 371 (c)(1),
(2) Date: Apr. 28, 2023

(87) PCT Pub. No.: WO2022/089762
PCT Pub. Date: May 5, 2022

(65) Prior Publication Data
US 2024/0348335 A1    Oct. 17, 2024

(51) Int. Cl.
*H04B 10/114* (2013.01)
*H04B 7/06* (2006.01)
*H04B 10/116* (2013.01)

(52) U.S. Cl.
CPC ....... *H04B 10/1149* (2013.01); *H04B 7/0617* (2013.01)

(58) Field of Classification Search
CPC .. H04B 10/1149; H04B 10/116; H04B 7/0617
USPC .......................................................... 398/115
See application file for complete search history.

(56) References Cited

U.S. PATENT DOCUMENTS

| | | | |
|---|---|---|---|
| 10,743,188 B2 | 8/2020 | Apostolopoulos et al. | |
| 2014/0218236 A1 | 8/2014 | Sadeghi et al. | |
| 2015/0147067 A1* | 5/2015 | Ryan | H04W 4/06 398/118 |
| 2016/0197676 A1* | 7/2016 | Dong | G01S 11/12 398/172 |

(Continued)

FOREIGN PATENT DOCUMENTS

| WO | 2020074056 A1 | 4/2020 |
|---|---|---|
| WO | 2020126039 A1 | 6/2020 |

OTHER PUBLICATIONS

LAN/MAN Standards Committee, "P802.11bb™/D0.2", Draft Standard for Information technology—Telecommunications and information exchange between systems Local and metropolitan area networks—Specific requirements, 2020, 1-51.

(Continued)

*Primary Examiner* — Dalzid E Singh
(74) *Attorney, Agent, or Firm* — Murphy, Bilak & Homiller, PLLC

(57) ABSTRACT

A position of a wireless device (11) is determined based on an optical communication signal transmitted between the wireless device (11) and one or more access points (10) of the wireless communication network. The determined position is used for controlling beamforming processing of radio communication signals transmitted between the wireless device (10) and one or more second access points (10) of the wireless communication network.

20 Claims, 14 Drawing Sheets

(56) References Cited

U.S. PATENT DOCUMENTS

2017/0047994 A1* 2/2017 Logvinov ............... H04W 4/80
2023/0179300 A1* 6/2023 Germe ................. H04B 10/116
398/130

OTHER PUBLICATIONS

Kahn, Joseph M., et al., "Wireless Infrared Communications", Proceedings of the IEEE, vol. 85, No. 2, Feb. 1997, 265-298.
Stavridis, Athanasios, et al., "Performance Evaluation of Space Modulation Techniques in VLC Systems", IEEE ICC 2015 0 Workshop on Visible Light Communications and Networking (VLCN), London, 2015, 1356-1361.

* cited by examiner

LIGHT-COMMUNICATION BASED CONTROL OF RADIO TRANSMISSIONS

TECHNICAL FIELD

The present invention relates to methods for controlling wireless transmissions and to corresponding devices, systems, and computer programs.

BACKGROUND

In wireless communication networks, e.g., based on a WLAN (Wireless Local Area Network) technology according to the IEEE 802.11 standards family, it is known to utilize beamformed RF (radio frequency) transmissions to achieve improved performance and/or capacity. The beamformed RF transmissions typically use multiple antenna elements to generate a beam pattern with one or more main lobes, also denoted as "radio beams" or shortly "beams", where signals of the multiple antenna elements interfere in a constructive manner, and "beamforming nulls" or shortly "nulls" where signals of the multiple antenna elements interfere in a destructive manner. An appropriate placement of beams and nulls improves the strength of the useful signal, while at the same time minimizing interference. At the receiver side, known beamforming methods are typically based on knowledge or estimation of Angles of Arrival (AoA) of the useful signal and the Angle of Arrivals of Interference (AoAoI). This information may be used to place the beams in the direction of the AoA and for placing the nulls need to be place in the direction of AoAoI. Similarly, the transmitter may place its beams in the directions that are expected to maximize signal strength at the intended receiver, while nulls may be placed in directions of other devices which could be affected by interference from the transmitted signal.

Further, studies in academia and early prototypes from industry have shown that Light Communication (LC) has a potential to become a new means of indoor wireless communication. Such LC technologies may be based on visible light or infrared light. It is expected that an LC system can achieve a throughput of Gigabits per second. Typically LC technologies are based on communicating binary data using rapidly varying levels of light intensity. For example, one or multiple Light Emitting Diodes (LEDs) are provided in a transmitting device in order to modulate binary data in different levels of emitted light intensity. The levels of the emitted light intensity may be changed at rates that are not perceivable by the human eye. Thus, it is for example possible to incorporate LC in an illumination system, without affecting the quality of illumination. A receiver may detect the changes of the emitted light intensity, e.g., using Photo Detectors (PDs). In this way, the receiver is able to detect the transmitted binary data.

Due to the nature of the optical channel, an LC system typically uses Intensity Modulation (IM) with Direct Detection (DD), see for example "Wireless Infrared Communications" by J. M. Kahn and J. R. Barry, Proc. IEEE, vol. 85, no. 2, pp. 265-298, February 1997. This means that the transmitted/received signal is real and strictly positive, which in turn imposes certain constraints on the deployed communication techniques, both in single and multi-carrier transmission. However, due to the relatively large physical area of a PD compared to the carrier wavelength, multipath fading is typically absent. Accordingly, a LC system may be implemented with less complex signal processing techniques than existing wireless communication technologies that are based on radio signals. An presentation of a Multiple-Input Multiple-Output point-to-point LC link is for example given in "Performance evaluation of space modulation techniques in VLC systems" by A. Stavridis and H. Haas, 2015 IEEE International Conference on Communication Workshop (ICCW), London, 2015, pp. 1356-1361.

LC can also be used in a cellular-like deployment, by utilizing multiple Access Points (APs) for providing LC-based wireless coverage in an indoor space. For example, multiple luminaries placed in the ceiling of a room for the purposes of illumination could also act as LC APs. In such deployment, each cell can be allocated a certain number of wireless stations (STAs) which are served in a certain portion of the available optical spectrum. Note that in LC, due to the directive nature of the optical wireless channel, the formation of a cellular LC system may depend strongly on geometrical setup of the APs and spatial positions and orientations of the STAs. As a consequence, the spatial setup of a transceiver along with its optical specifications determine the characteristics value of its optical channel and consequently its experienced receive SINR (Signal-to-Noise Plus Interference Ratio).

It is expected that in many practical scenarios there will be coexistence between RF and LC technologies. A MAC (Medium Access Control) mechanism enabling hybrid RF and LC networks is for example included in IEEE 802.11 standard amendment P802.11bb "Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications Amendment: Light Communications" (03-2018). Such hybrid RF and LC networks may be beneficial in a wide range of use cases. For example, it is considered to use LC for off-loading an RF network. Further, RF links can be used for increasing the robustness of an LC network. In particular, RF communication can for example be used as a fallback when Quality-of-Service (QoS) offered by LC is poor, such as in blockage-limited scenarios. In scenarios where RF and LC communication coexist, the use of services offered by different types of communication (RF and LC) can be beneficial. For example, a LC transceiver could benefit from services offered by the coexistent RF network and vice versa.

For beamformed RF communication, success of the concurrent beam and null forming, both in the transmitter and receiver, depends on the knowledge of the direction where the beams (main lobes) and nulls should be placed. The conventional approach for obtaining this knowledge is based on RF measurements. Such RF measurements consume valuable time-frequency resources, in particular when the RF measurements are performed to assess both signal quality of the useful signal and surrounding interference. Especially the sensing of the surrounding interference may be an extremely resource consuming process, because typically the whole surrounding space needs to be quantized and sensed. In addition, the accuracy of the RF measurements depends on the number of the allocated time-frequency resources which determine the time period of the sensing process. The allocation of more resources in the time domain typically helps to achieve higher accuracy. On the other hand, the accuracy may also suffer from RF measurements being outdated due to excessively long measurement periods. This problem may be particularly relevant in dynamic scenarios with high volatility, e.g., due to mobility of the receiver and/or transmitter.

Accordingly, there is a need for techniques which allow for efficiently and accurately controlling beamforming processing of radio transmissions in a wireless communication network.

SUMMARY

According to an embodiment, a method of controlling wireless transmissions in a wireless communication network is provided. According to the method, a wireless device determines a position of the wireless device based on an optical communication signal transmitted between the wireless device and one or more first access points of the wireless communication network. Based on the determined position, the wireless device controls beamforming processing of radio communication signals transmitted between the wireless device and one or more second access points of the wireless communication network.

According to a further embodiment, a method of controlling wireless transmissions in a wireless communication system is provided. According to the method, for each of one or more wireless devices, a node of the wireless communication network determines a position of the wireless device based on an optical communication signal transmitted between the wireless device and one or more first access points of the wireless communication network. Based on the determined one or more positions, the node controls beamforming processing of radio communication signals transmitted between the one or more wireless devices and a one or more second access points of the wireless communication network.

According to a further embodiment, a wireless device for a wireless communication network is provided. The wireless device is configured to determine a position of the wireless device based on an optical communication signal transmitted between the wireless device and one or more first access points of the wireless communication network. Further, the wireless device is configured to control, based on the determined position, beamforming processing of radio communication signals transmitted between the wireless device and one or more second access points of the wireless communication network.

According to a further embodiment, a wireless device for a wireless network provided. The wireless device comprises at least one processor and a memory. The memory contains instructions executable by said at least one processor, whereby the wireless device is operative to determine a position of the wireless device based on an optical communication signal transmitted between the wireless device and one or more first access points of the wireless communication network. Further, the memory contains instructions executable by said at least one processor, whereby the wireless device is operative to control, based on the determined position, beamforming processing of radio communication signals transmitted between the wireless device and one or more second access points of the wireless communication network.

According to a further embodiment, a node for a wireless communication network is provided. The node is configured to, for each of one or more wireless devices, determine a position of the wireless device based on an optical communication signal transmitted between the wireless device and one or more first access points of the wireless communication network. Further, the node is configured to, based on the determined one or more positions, beamforming processing of radio communication signals transmitted between the one or more wireless devices and a one or more second access points of the wireless communication network.

According to a further embodiment, a node for a wireless communication network is provided. The node comprises at least one processor and a memory. The memory contains instructions executable by said at least one processor, whereby the node is operative to, for each of one or more wireless devices, determine a position of the wireless device based on an optical communication signal transmitted between the wireless device and one or more first access points of the wireless communication network. Further, the memory contains instructions executable by said at least one processor, whereby the node is operative to, based on the determined one or more positions, beamforming processing of radio communication signals transmitted between the one or more wireless devices and a one or more second access points of the wireless communication network.

According to a further embodiment of the invention, a computer program or computer program product is provided, e.g., in the form of a non-transitory storage medium, which comprises program code to be executed by at least one processor of a wireless device is provided. Execution of the program code causes the wireless device to determine a position of the wireless device based on an optical communication signal transmitted between the wireless device and one or more first access points of the wireless communication network. Further, the wireless device is configured to control, based on the determined position, beamforming processing of radio communication signals transmitted between the wireless device and one or more second access points of a wireless communication network.

According to a further embodiment of the invention, a computer program or computer program product is provided, e.g., in the form of a non-transitory storage medium, which comprises program code to be executed by at least one processor of a node of a wireless communication network is provided. Execution of the program code causes the node to, for each of one or more wireless devices, determine a position of the wireless device based on an optical communication signal transmitted between the wireless device and one or more first access points of the wireless communication network. Further, the memory contains instructions executable by said at least one processor, whereby the node is operative to, based on the determined one or more positions, beamforming processing of radio communication signals transmitted between the one or more wireless devices and a one or more second access points of the wireless communication network.

Details of such embodiments and further embodiments will be apparent from the following detailed description of embodiments.

DETAILED DESCRIPTION OF EMBODIMENTS

Figure 1A:
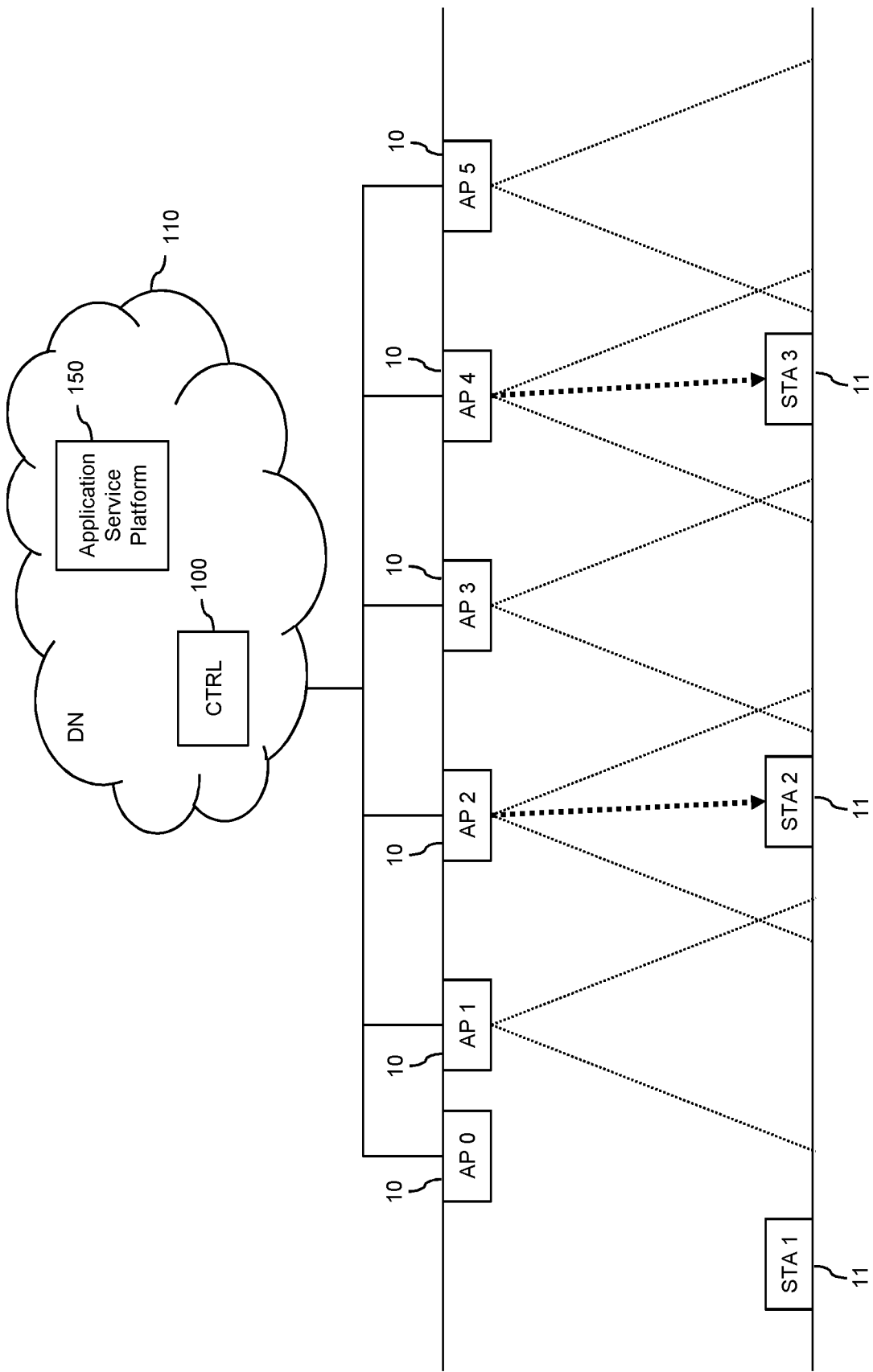
FIGS. 1A and 1B schematically illustrate an example of a scenario where beamforming processing is controlled according to an embodiment of the invention.

In the following, concepts in accordance with exemplary embodiments of the invention will be explained in more detail and with reference to the accompanying drawings. The illustrated embodiments relate to controlling of wireless transmissions in a hybrid wireless communication network utilizing both radio communication signals and optical communication signals. The wireless communication system may for example use radio communication based on a WLAN technology of the IEEE 802.11 standards family and an LC technology utilizing light in the visible and/or infrared spectrum. However, it is noted that the illustrated concepts could also be applied to other combinations of optical and radio communication technologies. For example, the radio communication could also be based on the LTE (Long Term Evolution) or NR (New Radio) technology specified by 3GPP (3$^{rd}$ Generation Partnership Project).

The illustrated concepts are based on utilizing that optical communication typically has a very directive and deterministic nature of the utilized optical channel. Accordingly, the optical channel may be used as a basis for accurately estimating positions of wireless devices. These positions may in turn be used as a basis for efficiently and accurately controlling beamforming processing of radio communication signals.

In the following explanations, it is assumed that the optical communication is based on a cellular LC deployment with multiple LC cells. Due to the directive and deterministic nature of the optical channels utilized in the respective LC cells, it may be possible to compute a maximum level of interference, $I_{max}$, for the coverage region of each LC cell. Thus, for each LC cell, interference can be treated as a deterministic quantity which is known a priori. It therefore becomes possible that ranges of observed SINR can be accurately estimated for each position in space. Thus, if the LC cellular deployment uses a cell association method which is based on the value of SINR for one, a portion, or all the available optical subcarriers, the coverage area of each cell can be accurately defined and estimated.

The direct result of this conclusion is that, when a wireless device is associated with a certain LC cell, this information may be utilized to accurately estimate the position of the wireless device. In some cases, the cell association may be based on static spatial position of the wireless device, so that the spatial position of the wireless device may be derived from the cell association. Further, deriving the spatial position of the wireless device from the cell association is also possible for mobile devices, where the association to LC cells may vary in a dynamic manner. In that case, borders of the coverage areas of the LC cells may be used for deriving the positions of the wireless device from its association to the LC cells.

As mentioned, the estimated positions of one or more wireless devices may be used to control the beamforming processing of radio communication signals. Specifically, the estimated positions may be used to decide where to place beams and nulls, and the placement of beams and nulls may be considered in synthesis of a far-field radiation pattern of the radio communication signals, e.g., by taking into account azimuthal and zenithal angle of beams and nulls. In the following explanations, it is for the purpose of simplicity assumed that three-dimensional beams are created using a planar rectangular antenna array, where antenna elements (AEs) are arranged with distances of at least $\lambda/2$ along vertical and horizontal directions. It is however noted that a similar approach could also be applied to any other antenna array geometry. The far-field radiation $F(\theta, \phi)$, in zenithal direction $\theta$ and azimuthal direction $\phi$, is may be represented as:

$$F(\theta, \phi) = w^H a(\theta, \phi), \qquad (1)$$

where, w, is defined $$w = [w_{11}, w_{12}, \ldots, w_{1N_V}, \ldots, w_{N_H 1}, w_{N_H 2}, \ldots, w_{N_H N_V}]^T, \qquad (2)$$

Here, $w_{kl}$, denotes a weight of the antenna element, (k,l), k=1, ..., $N_H$, and, l=1, ..., $N_V$. Here, the vector $a(\theta, \phi)$ is defined as $a(\theta, \phi) = A(\theta, \phi)[\alpha_{11}, \alpha_{12}, \ldots, \alpha_{1N_V}, \ldots, \alpha_{N_H 1}, \alpha_{N_H 2}, \ldots, \alpha_{N_H N_V}]^T$, with, $$\alpha_{k,l} = e^{j\frac{2\pi}{\lambda} r_{kl}^T d(\theta,\phi)},$$

and $d(\theta, \phi) = \sin\theta \cos\phi\ [1,0,0]^T + \sin\theta \sin\phi\ [0,1,0]^T + \cos\theta\ [0,0,1]^T$ denoting a unitary vector identifying the far-field radial direction.

In this case, an optimization problem for determining w may be expressed as:

$$\min_w |w^H a(\theta)|^2 \qquad (3)$$

subject to: desired beams and nulls

The desired beams are represented as, $\theta_i \in \{\theta_1^{beam}, \ldots, \theta_{N_{STA}}^{beam}\}$, and the desired nulls are represented as, $(\theta_i, \phi_i) \in \{(\theta_1^{null}, \phi_1^{null}), \ldots,$ $$\left(\theta_{N_{STA}}^{null}, \phi_{N_{STA}}^{null}\right)\}.$$

Furthermore, $(\theta_i^{beam}, \phi_i^{beam})$ describes the direction, where the i-th beam needs to be placed, with $\theta_i^{beam}$ being the azimuthal angle of the beam and $\phi_i^{beam}$ being the zenithal angle of the beam. Thus, the direction of the i-th beam can be described by the vector, $d(\theta_i^{beam}, \phi_i^{beam}) = \sin\theta_i^{beam}\cos\phi_i^{beam}[1,0,0]^T + \sin\theta_i^{beam}\sin\phi_i^{beam}[0,1,0]^T + \cos\theta_i^{beam}[0,0,1]^T$. Further, $(\theta_i^{null}, \phi_i^{null})$ describes the direction where the i-th null needs to be placed, with $\theta_i^{null}$ being the azimuthal angle of the null and $\phi_i^{null}$ being the zenithal angle of the null. Thus, the direction of the i-th null can be described by the vector, $d(\theta_i^{null}, \phi_i^{null}) = \sin\theta_i^{null}\cos\phi_i^{null}[1,0,0]^T + \sin\theta_i^{null}\sin\phi_i^{null}[0,1,0]^T + \cos\theta_i^{null}[0,0,1]^T$.

Accordingly, the beamforming processing of the radio communication signals, at the transmitter and/or at the receiver, depends on knowledge of the direction where the beams and nulls should be placed, which can be represented by $(\theta_i, \phi_i) \in \{(\theta_1^{beam}, \phi_1^{beam}), \ldots, (\theta_{N_{STA}}^{beam}, \phi_{N_{STA}}^{beam})\}$ and, $(\theta_i, \phi_i) \in \{(\theta_1^{null}, \phi_1^{null}), \ldots,$ $$\left(\theta_{N_{STA}}^{null}, \phi_{N_{STA}}^{null}\right)\}.$$

This information can in turn be derived from the positons estimated using the LC signals. In some scenarios, this information may also be derived by considering the LC signals in combination with other information, such as information obtained from RF measurements and/or historical data.

In the following, the illustrated concepts will be explained in more detail by referring to exemplary scenarios involving a hybrid LC/RF wireless communication network with multiple APs and multiple STAs served by the APs. The APs include APs providing LC coverage, in the following denoted as LC APs, APs providing RF communication coverage, in the following denoted as RF APs, and APs providing both LC and RF communication coverage, in the following denoted as hybrid APs. Here, it is noted that a hybrid AP may be considered as being both an LC AP and an RF AP. The STAs are assumed to support both LC and RF communication. In the illustrated examples, the STAs support reception of LC signals, i.e., LC communication in a downlink (DL) direction from the AP to the STA. However, it is noted that it would also be possible to alternatively or additionally support LC communication in an uplink direction from the STA to the AP. In some scenarios, the RF communication may be based on line-of-sight (LoS) RF links between the APs and the STAs. In other scenarios, also non-line-of sight (NLoS) RF links between the APs and the STAs may be considered.

It is noted that due to the very directive nature of the LC optical channel, densification of the LC APs is typically easier than densification of RF APs. Therefore, it can be assumed that, for a practical deployment in a given three-dimensional space, the number of LC APs is larger than the number of RF APs. In the examples illustrated below, the number of APs supporting RF communication is assumed to be two. However, in other scenarios the number of APs supporting RF communication could be three or more.

When a STA is connected to a LC AP, the LC AP implicitly knows the region where the STA is physically located. This knowledge may be distributed in the network, e.g., to other APs, including the APs supporting RF communication. Since the coverage area of a LC AP is typically rather limited, the coverage area of the LC AP typically provides a good estimate of the exact position of the STA. Similarly, based on the knowledge to which LC AP the STA is connected, also the STA can derive the region where it is physically located. For this purpose, the STA may be provided with information on the coverage areas of the available LC APs. Such information can for example be provided during initial access of the STA to the wireless communication network or through configuration signaling at a later stage. Furthermore, using one or more internal sensors, the STA may also estimate its relative orientation relative to the available APs. From the perspective of the STA, the knowledge to which LC AP the STA is connected may thus be used to derive the relative positions of one or more RF APs.

Accordingly, the position of the respective STA may be derived by considering to which LC AP the STA is connected. By using this LC positioning information the RF APs can place their beams and nulls for beamformed transmission of RF communication signals. Similarly, also the STAs may use the LC positioning information to place their beams and nulls for beamformed transmission of RF communication signals. Typically, each RF AP would place a beam towards the estimated positions of each STA served by the RF AP. Further, each RF AP would place a null towards the estimated positions of each STA not served by the RF AP. Similarly, each STA may place a beam towards the estimated relative position its serving RF AP and may place one or more nulls towards the estimated relative positions of one or more other RF APs.

It is noted that it may also occur that one or more STAs are not connected or associated to any LC AP. In such cases, the LC signals transmitted between the LC APs and the STAs, e.g., LC beacons, could still be used for obtaining LC positioning information, e.g., by deriving the position of the STA considering received signal strengths of LC signals, e.g., in terms of SINR. Further, for STAs which are out of coverage of the LC APs or for STAs which do not support LC, the placement beams and nulls could also be derived from RF measurements and/or historical data. For example, in such cases the placement of beams and nulls could be based on a beam-sweeping procedure using dedicated time-frequency resources. Such beam-sweeping procedure typically involves active participation by both the RF AP and the STA, e.g., by sending reference signals and performing measurements on the received reference signals. In addition or as an alternative, the placement of beams and nulls may be based on a beam-sweeping procedure without explicitly allocated time-frequency resources where the STA and/or the RF AP senses its environment for interfering signals. The information obtained from RF measurements and/or the historical data may be used to supplement the available LC positioning information.

Accordingly, the illustrated concepts may be applied in the following scenario: A number of LC APs provide coverage for optical communication in a three-dimensional space, e.g., an indoor space. In addition, the same space is served by at least one RF AP, typically two or more RF APs. In the considered space, there is a number of STAs which support both RF communication and LC. These STAs are assumed to support reception of LC signals. Optionally, the STAs could also support transmission of LC signals. Such LC signals transmitted by a STA may also include LC beacons transmitted for supporting LC cell association or LC positioning measurements. Furthermore, the LC APs and the RF APs are capable to exchange information via a wired or wireless backhaul link. This backhaul link can be utilized by the RF APs to acquire the LC positioning information, e.g., in terms of estimated position of the STAs in the considered space. Further, the backhaul link can also be used to exchange other information, e.g., the above-mentioned supplemental information to be used for the placement of beams and nulls, such as information obtained from RF measurements and/or historical data.

Based on the LC positioning information, the beam-synthesis process for the RF communication signals is adjusted in the respective RF AP and STA. It is noted, that this is also possible in scenarios with a mixture of LoS and NLoS RF links. In particular, when there are NLoS RF links and these RF links are identified, RF measurements or historical data may be utilized for the placement of beams only for the subset of NLoS RF links. The placement of the nulls may still be performed on the basis of the LC positioning information, because any blockage in the direction of a null typically does not have any adverse effects. As a result, it is possible that only for the NLoS RF links, utilization of RF measurements or historical data are needed for determining the direction of the desired beams. For the LoS RF links, the beams can be place exclusively on the basis of the LC positioning information.

Figure 1B:
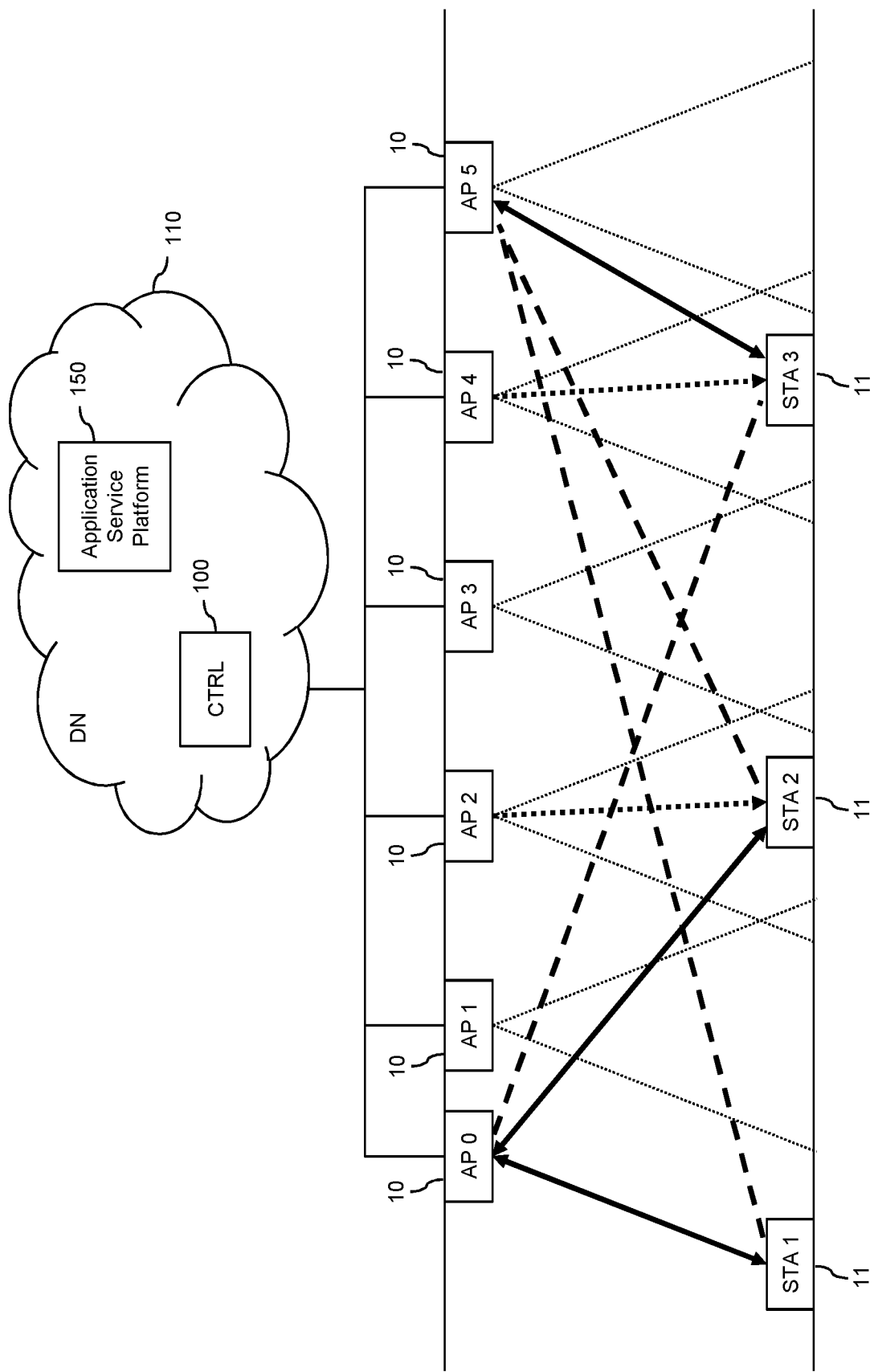

FIGS. 1A and 1B illustrate an example of a scenario, where beamforming processing of RF communication signals is controlled in accordance with the illustrated concepts. Specifically, FIGS. 1A and 1B illustrate APs 10 of the hybrid wireless communication network and a number of STAs 11 which each support RF and LC communication. The APs are denoted as AP 0, AP 1, AP 2, AP 3, AP 4, and AP5. The STAs 11 are denoted as STA 1, STA 2, and STA 3. AP 0 and AP 5 are assumed to be RF APs. AP 1, AP 2, AP 3, AP 4, and AP 5 are assumed to be LC APs. Accordingly, AP 5 supports both LC and RF communication and can be considered as a hybrid AP. LC coverage regions of the LC APs are illustrated by dotted lines. As can be seen, in the illustrated example the LC coverage regions are substantially conical and taper towards the respective LC AP. However, it is noted that the LC coverage regions could also have other geometries, which can be controlled by transmitting the LC signals through one or more lenses and/or masks. The scenario of FIGS. 1A and 1B corresponds to a typical indoor scenario, with the APs 10 being placed on a ceiling of a room, and the STAs 11 being on a floor if the room. In such scenario, at least the LC APs could for example be integrated in luminaires, and light sources of these luminaires, e.g., LEDs, could also be used as sources of the LC signals.

Each AP 10 may provide data connectivity of the STA(s) 11 connected to the AP 10, using an LC link or an RF link. As further illustrated, the APs 10 may be connected to a data network (DN) 110. In this way, the APs 10 may also provide data connectivity of STAs 11 connected to different APs 10. Further, the APs 10 may also provide data connectivity of the STAs 11 to other entities, e.g., to one or more servers, service providers, data sources, data sinks, user terminals, or the like. Accordingly, a link established between a given STA 11 and its serving AP 10 may be used for providing various kinds of data services to the STA 11, e.g., a service related to industrial machine control. Such services may be based on applications which are executed on the STA 11 and/or on a device linked to the STA 11. By way of example, FIGS. 1A and 1B illustrate an application service platform 150 provided in the DN 110. The application(s) executed on the STA 11 and/or on one or more other devices linked to the STA 11 may use their respective link for data communication with one or more other STAs 11 and/or the application service platform 150, thereby enabling utilization of the corresponding service(s) at the STA 11. As further illustrated, the DN 110 includes a control node, which may be used for controlling and otherwise coordinating operation of the APs 10 and STAs 11.

FIG. 1A illustrates an initial stage of the processes, where the LC positioning information is obtained. In the illustrated example, it is assumed that STA 2 has an LC link to AP 2, and that STA 3 has an LC link to AP 4. These LC links are based on an LC signal transmitted by the LC AP. The LC signals are illustrated by a dotted arrows. The LC links may be used for data transfer from the respective AP to the connected STA. The LC APs are aware of their respectively connected STAs. That is to say, AP 2 is aware that STA 2 is connected by an LC link to AP 2. Similarly, AP 4 is aware that STA 3 is connected by an LC link to AP 4. Further, STA 2 is aware that it is connected by an LC link to AP 2, and STA 3 is aware that it is connected by an LC link to AP 4. This awareness can be established using an initial access process and the feedback from the STAs. The APs 10 may share information concerning their respectively connected STAs among each other. Further, the APs may also provide information concerning their respectively connected STAs or information obtained from measurements with respect to the STAs to the control node 100. In particular, the APs 10 and/or the control node 100 may acquire LC positioning information indicating the positions of STA 2 and STA 3 as derived from the LC signals. Similarly, also STA 2 and STA 3 may acquire LC positioning information indicating the relative positions the APs 10, in particular the RF APs, as derived from the LC signals. This information is then used for controlling RF links to at least some of the STAs 11, in particular for controlling the placement of beams and nulls in the beam pattern synthesis. The result is illustrated in FIG. 1B. In this way, useful signals may be enhanced and interference reduced or eliminated.

In FIG. 1B, the RF links and the corresponding beams are illustrated by solid double-headed arrows. The nulls are illustrated by dashed lines. As can be seen, based on the LC positioning information, it is decided to establish an RF link between STA 2 and AP 0, which is the closest RF AP to STA 2. Further, AP 0 controls the beamforming processing of its RF signals based on placing a beam in the direction from AP 0 to STA 2. This direction may be estimated from the acquired LC positioning information. Further, AP 0 controls the beamforming processing of its RF signals based on placing a null in the direction from AP 0 to STA 3. Also this direction may be estimated from the acquired LC positioning information. Still further, based on the LC positioning information, it is decided to establish an RF link between STA 3 and AP 5, which is the closest RF AP to STA 3. Further, AP 5 controls the beamforming processing of its RF signals based on placing a beam in the direction from AP 5 to STA 3. This direction may be estimated from the acquired LC positioning information. Further, AP 5 controls the beamforming processing of its RF signals based on placing nulls in the directions from AP 5 to STA 2. Also this direction may be estimated from the acquired LC positioning information. Similarly, STA 2 controls the beamforming processing of its RF signals based on placing a beam in the direction from STA 2 to AP 0 and placing a null in the direction from STA 2 to AP 5, and STA 3 controls the beamforming processing of its RF signals based on placing a beam in the direction from STA 3 to AP 5 and placing a null in the direction from STA 2 to AP 0. It is noted that the decision to which RF AP a certain STA should establish the RF link, i.e., the RF cell association, may be based on various criteria, such as selecting the RF AP having the smallest Euclidean distance to the STA. Based on the RF cell association, it can then be decided where to place the beams and where to place nulls. In particular, the RF AP should place beams in directions of its associated STAs and nulls in directions of other STAs. Similarly, the STA should place beams in the direction of its associated RF AP and nulls in directions of other RF APs.

In the example of FIGS. 1A and 1B, STA 1 is not connected to any LC AP, because it is outside LC coverage of all APs 10. As a result, no LC positioning information is available for STA 1. In this case, RF positioning information for STA 1 may be obtained based on RF measurements, e.g., measurements performed on RF signals transmitted between AP 0 and STA 1 and between AP 5 and STA 1. Based on such RF positioning information, it can be determined that for STA 1 the closest RF AP is AP 0. Further, the RF positioning information can be used as a basis for determining the direction from AP 0 to STA 1, the direction from AP 5 to AP 1, the direction from STA 1 to AP 0, and the direction from STA 1 to AP 5. Accordingly, the RF positioning information can be used to place the beams and nulls. In the illustrated example, AP 0 uses the RF positioning information to place a beam in the direction of STA 1, and AP 5 uses the RF positioning information to place a null in the direction of STA 1. Similarly, STA 1 uses the RF positioning information to place a beam in the direction of AP 0 and to place a null in the directions of AP 5.

Figure 2:
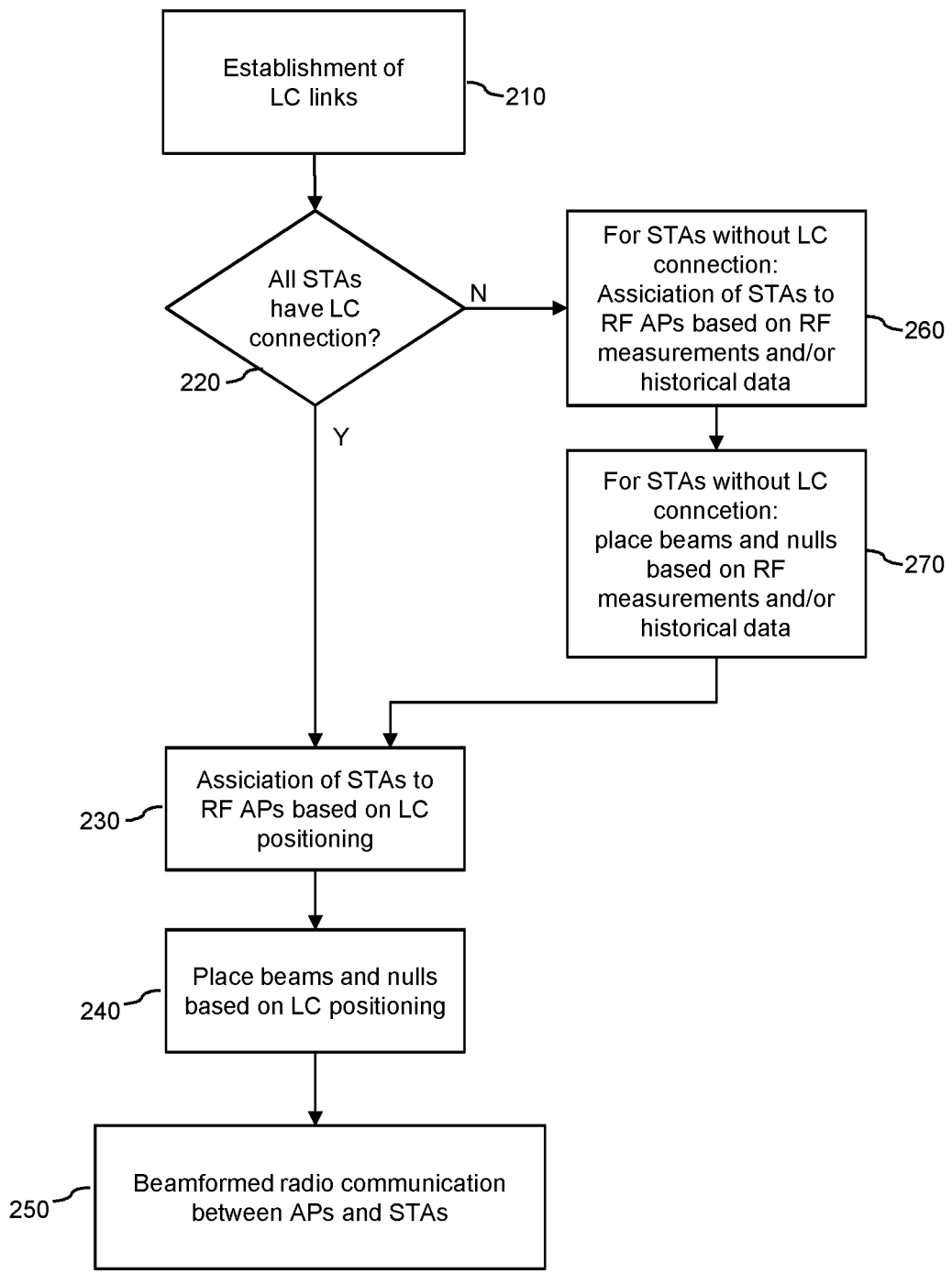
FIG. 2 shows a flowchart for schematically illustrating an example of processes according to an embodiment.

FIG. 2 shows a flow diagram for illustrating processes as described in connection with FIGS. 1A and 1B. In the processes of FIG. 2, it is assumed that at block 210 an LC link is established for at least one of the STAs, e.g., via a corresponding initial access procedure. In order to also consider STAs which do not have an established LC link, block 220 then includes a determination whether all STAs have an established LC link. If this the case, as indicated by branch "Y", the processes continue to block 230, where the LC positioning information is used to associate STAs to RF APs, and then to block 240, where the beams and nulls are placed based on the LC positioning information. Then, at block 250, beamformed radio communication is performed between the APs and STAs, utilizing beamforming processing based on the placement of beams and nulls obtained at block 240. The beamformed radio communication may involve beamforming processing at the RF APs and STAs.

If at block 220 it is found at not all STAs have an established LC link, the processes continue with blocks 260 and 270, as indicated by branch "N". At block 260, RF measurements and/or historical data are used for associating the STA(s) without LC link to RF APs. At block 270, the beams and nulls for the STA(s) without LC link are placed based on RF measurements and/or historical data. Then the processes may continue to block 230 to treat the remaining STAs in the above-described manner based on the LC positioning information.

Accordingly, in the processes of FIG. 2, RF measurements can be used to supplement the LC positioning information. The RF measurements may for example involve beam-sweeping processes. During such beam-sweeping process, the AoA (Angle of Arrival) and AoD (Angle of Departure) between the RF APs and STAs that do not have an LC link can been obtained. Furthermore, also the AoA of interference can been obtained by these STAs and RF APs. Alternatively or in addition to using beam sweeping processes, information on the AoA and AoD of the useful signal and/or information on the AoA of interference could also be acquired via passive listening during idle times. However, typically the utilization of RF measurements results in increased consumption of resources, in particular when considering that accuracy of the AoA and AoD estimation increased when allocating more time to the RF measurements. Accordingly, the consideration of the LC positioning information may provide significant benefits, because it allows for reducing the amount of RF measurements. In particular, for the STAs having an LC link, the LC positioning information can be used for deriving the AoAs and AoDs of the useful signal, and the AoAs of interference.

In the example of FIGS. 1A and 1B, it was assumed that there are LoS conditions between the RF APs and the STAs. In such cases, consideration of the geometry of RF APs and STAs indicated by the LC positioning information may be sufficient to derive the AoAs and AoDs of the useful signals, as well as the AoAs of interference. However, if there are NLoS conditions between one or more of the RF APs and STAs, the situation is typically more complex. Such NLoS conditions may for example be due to blockages of the direct LoS path between the RF AP and the STA. In practical scenarios, it the presence of a mixture of LoS conditions and NLoS conditions between the RF APs and the STAs can be quite typical. As will be further explained below, the illustrated concepts may also be applied in such scenarios.

In scenarios with a mixture of LoS conditions and NLoS conditions between the RF APs and the STAs, NLoS RF links may be utilized when there is no LoS condition between an RF AP and a STA or if a LoS RF link would not offer sufficient quality to support communication, e.g., due to excessive interference on the LoS RF link.

For NLoS RF links, the LC positioning information could not be useful for proper placement of a beam, because the LoS path no longer corresponds to the RF signal propagation path offering the best characteristics. Rather, it may be preferable to setup a NLoS RF link based on a beam which is placed in the direction of a NLoS path, e.g., the NLoS path offering the lowest path loss, which may allow for maximizing the SNR (Signal-to-Noise Ratio) of the received useful signal. In some scenarios, the beam may also be placed in a direction which offers a trade-off between different metrics, e.g., SNR and desired power delay profile. In each case, the direction of the beam can be determined based on RF measurements and negotiation between the involved RF APs and STAs, and/or or by using historical data and positioning data combined with Bayesian reasoning. Further, the direction of the beam could also be determined based on a combination of the above criteria. As explained above, the use of RF measurements may help to improve performance, but typically involves consumption of resources. In contrast, the use of Bayesian reasoning with historical data and positioning data can provide reasonable performance in certain scenarios, while at the same time avoiding excessive use of resources for RF measurements.

Figure 3A:
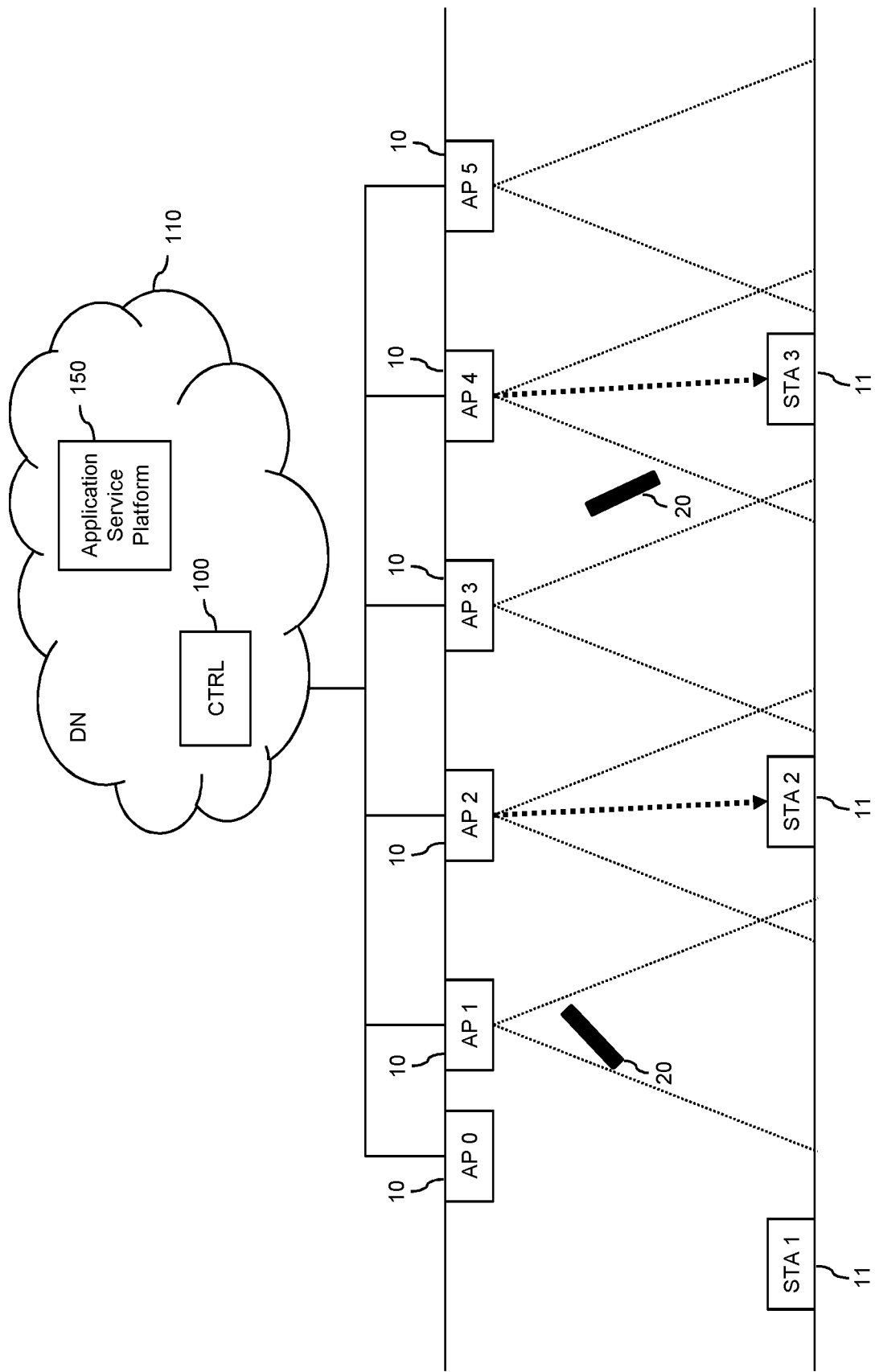
FIGS. 3A and 3B schematically illustrate a further example of a scenario where beamforming processing is controlled according to an embodiment.
Figure 3B:
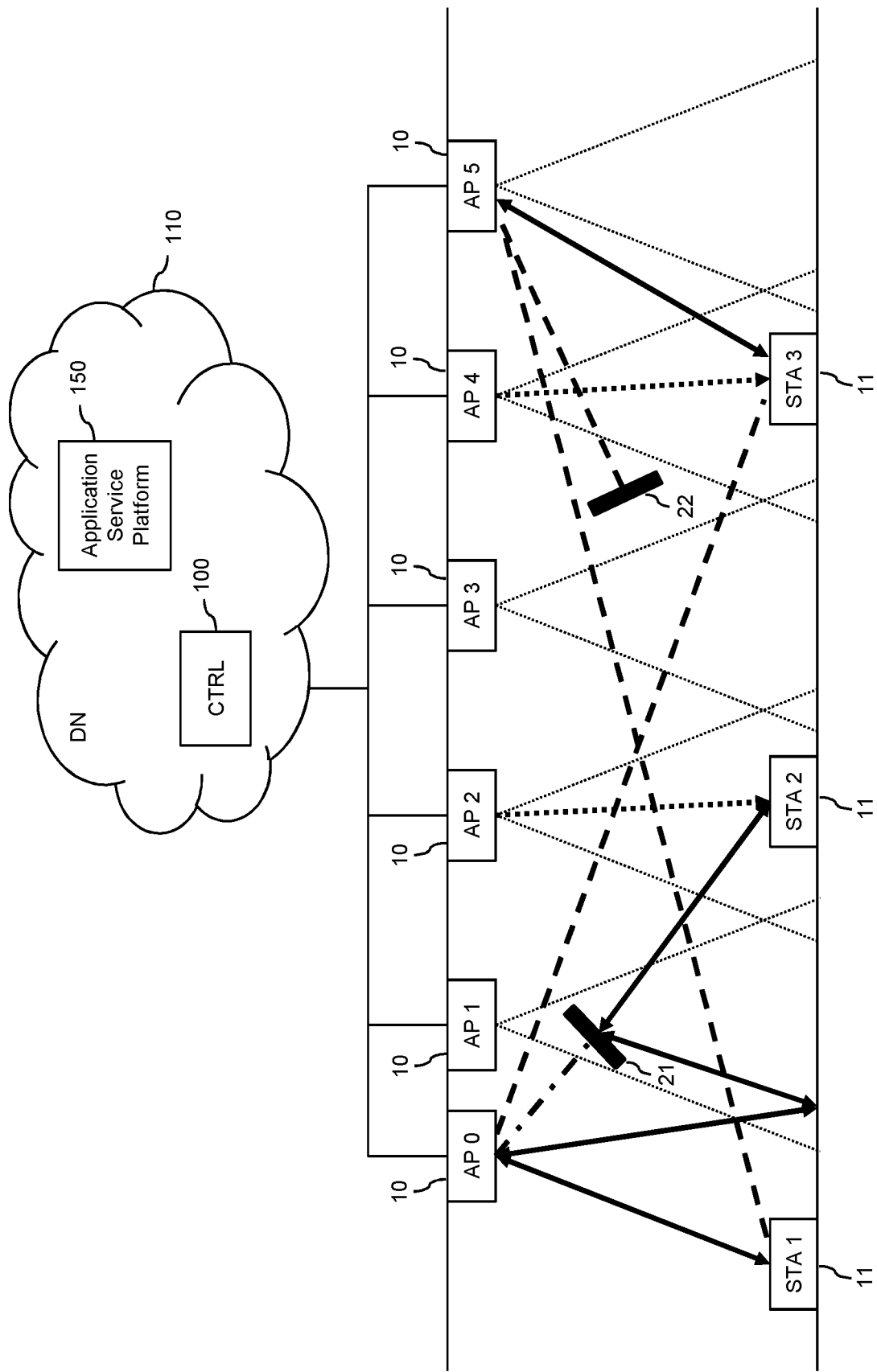

FIGS. 3A and 3B illustrate a further example of a scenario, where beamforming processing of RF communication signals is controlled in accordance with the illustrated concepts. The example of FIGS. 3A and 3B is similar to that of FIGS. 1A and 1B, but differs in the presence of a blockage 21 in the LoS paths between AP 0 and STA 2 and a blockage 22 in the LoS path between AP 5 and STA 2. Accordingly, there is no LoS condition between AP 0 and STA 2, and there is no LoS condition between AP 5 and STA 2. This is considered in the placement of beams and nulls in the beam pattern synthesis at AP 0, AP 5, and STA 2. The result is shown in FIG. 3B. As can be seen from FIG. 3B, an NLoS RF link is established between AP 0 and STA 2. As illustrated, the NLoS RF link is based on indirect propagation of RF signals between AP 0 and STA 2. As mentioned above, the corresponding placement of the beams in the direction of the useful signal at AP 0 and STA 2 may be determined from RF measurements and and/or or by using historical data and positioning data combined with Bayesian reasoning. At AP 5, there is still a null placed in the direction corresponding to the LoS path from AP 5 to STA 2. At STA 2, a null in the direction of the LoS path from STA 2 to AP 5 is omitted in view of the presence of the blockage 22. This omission may help to reduce computational complexity of the beam pattern synthesis at STA 2. Otherwise, reference is made to the description in connection with FIGS. 1A and 1B.

In the illustrated concepts, a requirement to also utilize NLoS RF links can be accommodated by determining the directions of beams for the LoS links in the above-mentioned manner from the LC positioning information and while for any NLoS RF links the placement of beams is performed in the above-mentioned manner based on RF measurements and/or historical data and positioning data combined with Bayesian reasoning.

Regarding the placement of nulls, the blockage of the direction of where a null should be placed according to the LC positioning information typically does not have negative effects to the beam-pattern synthesis. That is because a blockage further improves the effects of a null towards the direction of where interference needs to be avoided. In other words, a blockage towards the direction of nulls may be considered as desirable. In a simple approach, the presence of the blockage in the direction of a null may be ignored in the beam-pattern synthesis. In the illustrated concepts, information on presence of a blockage in the direction of a null can however also be used for relaxing computational complexity of the beam-pattern synthesis. Such information on the presence of the blockage could be acquired from a previous attempt of an RF transmission between the RF AP and the considered STA or from a beam-sweeping process.

In order to accommodate scenarios with both LoS and NLoS RF links, the above-described processes may be modified as follows: Initially, it can be assumed that all RF links to be established are LoS RF links. Based on this assumption, the directions of the beams and nulls can be determined as explained in connection with FIGS. 1A, 1B, and 2, and then be used in the beam-pattern synthesis. Then, the quality of the established RF links can be assessed, e.g., based on regular data transmissions or based on reference signals transmitted for the purpose of assessing the quality of the RF links. The quality of the RF links can for example be measured in terms of frame error rate or received SINR. Based on these evaluations, it can be determined for which RF links the initial beam-pattern synthesis achieves a required QoS level.

For only those RF links that do not achieve the required QoS level, the placement of the beam may be discarded and a process for estimating the AoA and AoD of the useful signal is initiated. As described before, such process can be based on RF measurements, e.g., in a beam-sweeping process, or on historical data. From this process, the directions of beams for the respective RF links can be determined. Using these new directions of beams along with those which were not discarded, a new beam-pattern synthesis performed. If there is information regarding one or more blockages in the directions where nulls are placed, these nulls may be discarded in order to reduce the computational complexity of the beam-pattern synthesis. However, if there is no such information on a blockage, then the directions of the nulls may be included in the beam-pattern synthesis.

In some cases, the new directions of beams may increase interference to other RF links. In this case, the beam-pattern synthesis may be repeated with another direction of the beams of RF links affected by interference. At the transmitter side, a null may be placed instead of the beam in the direction affected by interference. Also at the receiver side, a null may be placed instead of the beam in the direction affected by interference, or the direction may be neglected.

For the RF link(s) that caused interference, a new process for estimating alternative AoA and AoD which offer sufficiently good QoS may be initiated. Upon the completion of this process, beam-synthesis occurs in all RF AP and STA using the determined directions of beams and nulls. The new directions may be selected as those offering the best performance while avoiding the known directions where interference occurred.

The above operations may be iterated until the required QoS level is met for all RF links or a maximum number of iterations is reached. If the maximum number of iterations is reached, the initial cell association and placement of beams and nulls may be repeated, however excluding at least some of the previous associations of STAs to RF APs. The maximum number of iterations can for example be determined by the number of iterations resulting in checking of the entire considered space by beam-sweeping processes.

Figure 4:
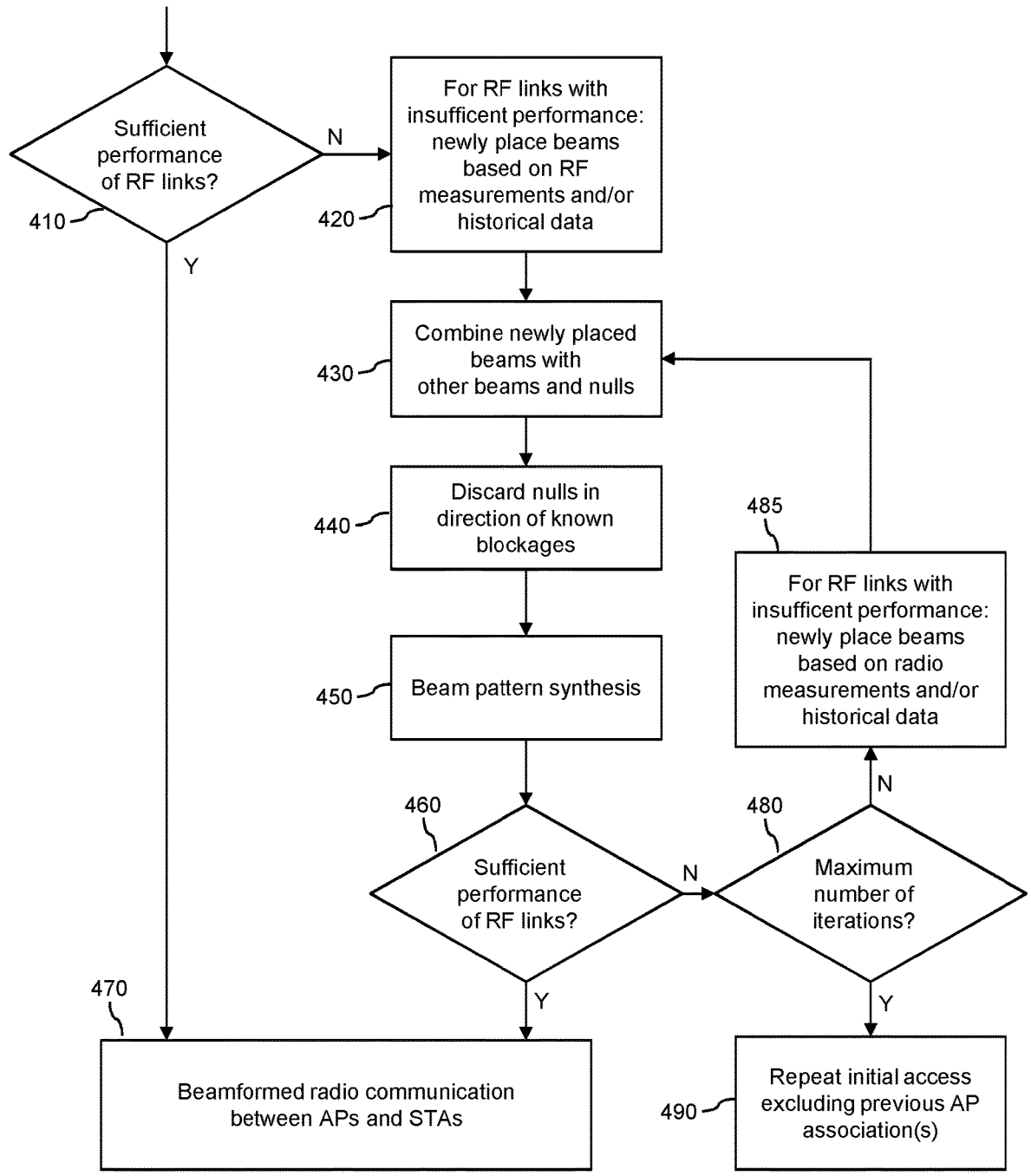
FIG. 4 shows a flowchart for schematically illustrating a further example of processes according to an embodiment.

FIG. 4 shows a flowchart for illustrating processes which may be used to accommodate NLoS RF links in the above-described manner. The processes of FIG. 4 may for example be performed after initial cell association and placement of beams and nulls according to the processes of FIG. 2.

At block 410, it is determined whether the performance is sufficient for all RF links, e.g., by assessing if the RF links each meet the required QoS level. If this is not the case, as illustrated by branch "N", the processes continue with block 420, where the beams of the RF links with insufficient performance are newly placed based on RF measurements and/or historical data. At block 430, the newly placed beams are then combined with the other beams and nulls, as determined from the LC positioning data.

If there is information on one or more known blockages, nulls in the direction of such nulls may be discarded at block 440 to reduce computational complexity of the beam pattern synthesis. Alternatively, such blockages could also be neglected.

At block 450, beam pattern synthesis is performed based the previously placement of beams and nulls, and subsequently block 460 involves a further check if all RF links now offer sufficient performance, e.g., meet the required QoS level. If this is the case, as illustrated by branch "Y", the processes continue to block 470, where beamformed radio communication is performed between the APs and STAs, utilizing beamforming processing based on the beam patterns synthesized at block 450. The beamformed radio communication may involve beamforming processing at the RF APs and STAs. Further, if already at block 410 all RF links are found to have sufficient performance, as illustrated by branch "Y", the processes continue to block 470, where beamformed radio communication is performed between the APs and STAs, utilizing beamforming processing based on the beam patterns synthesized based on the placement of beams and nulls initially derived from the LC positioning information.

If the check of block 460 yields that there are still RF links with insufficient performance, the processes continue of block 480, where it is checked if a maximum number of iterations for optimizing the placement of beams is reached. If this is not the case, as indicated by branch "N", the processes continue to block 485, to perform a further attempt to newly place the beams of the RF links with insufficient performance based on RF measurements and/or historical data, however while discarding beam placements which were found to provide insufficient performance in previous attempts. The process may then return to block 430 to combine the newly placed beams with the other beams and nulls. If the check of block 480 reveals that the maximum number of iterations is reached, the processes continue to block 490, where the initial access involving on cell association and placement of beams and nulls based on the LC positioning information is repeated, however excluding one or more RF AP associations of the previous attempt, e.g., one or more of the associations of STAs to an RF AP that resulted in insufficient performance of the corresponding RF link.

The illustrated concepts may be applied in various use cases. Such use cases include scenarios where there is a communication loss on an LC link and a new RF link needs to be established to compensate for the communication loss on the LC link. Further such use cases include that here is a need for concurrent LC and RF communication with one or more STAs, and one or more additional RF links need to be setup for this purpose. Further, such use cases include that there is a mobile STA moving from the coverage area of one LC AP to the coverage area of another LC AP, while concurrently communicating with the network.

Similarly as before, for the description of the previous use cases, we assume that the considered space accommodates two or more RF APs, multiple LC APs, and STAs connected to the RF APs and/or STAs connected to the LC APs. Here, it is noted that a STA may also be concurrently connected to both an RF AP and an LC AP. As mentioned above, the RF APs and the LC APs may be connected by wired or wireless backhaul links. Also, it is assumed that, whenever there is a RF connection between an RF AP and a STA, both the transmit and receive beam pattern of the involved RF AP and STA are designed by setting a number of beams, i.e., main lobes, and/or a number of nulls. The existing placement of the beams and nulls may be based on RF measurements or on LC positioning information.

Now considering the use case involving a loss of an LC link, it can for example be assumed that the LC link is lost due to a light blockage or due to a drop of the optical SINR at the receiver side. The latter case may for example corresponds to a scenario where the optical SINR is not high enough to support the required data rate. This can for example happen due to the mobility of the involved STA or due to volatility of the surrounding environment.

Provided that the considered STA is connected to a specific LC AP, its position can be estimated in the above-described manner based on the LC cell association, and the corresponding LC positioning information can be shared in the network, utilizing the backhaul links of the APs. More specifically, once a STA is connected or associated to a LC AP, this LC AP may inform the RF APs regarding this connection or association. In this case, as the positions of the LC APs and consequently their coverage areas are static, the RF APs can be configured with information about the respective coverage regions of the LC APs. Accordingly, by being informed to which LC AP a STA is connected or associated, the RF APs can estimate the position of the STA. However, it would also be possible that correlation of the coverage area of the LC AP with the connection or association status of the STA is performed by the LC AP or the STA, so that the LC positioning information explicitly indicates the position of the STA. The STA can be informed about the positions and coverage areas of the RF APs and LC APs using an RF link or LC link, e.g., during an initial access process or by configuration signaling at a later stage. It is also possible that the information concerning the RF APs and LC APs which is provided to the STA depends on the position of the STA, e.g., by being limited to RF APs and LC APs that are within a certain range from the STA.

When a STA loses its connection with its serving LC AP and the STA is aware of its position, it can then determine a suitable RF AP for establishing an RF link, e.g., by selecting the RF AP that is closest to the estimated position of the STA. This selection could also be based on configuring the STA with priority information indicating, for each LC AP, which RF APs are to be preferred for establishment of an RF link if the LC connection to this LC AP is lost. The STA may then determine its orientation, e.g., using one or more internal sensors, and use the estimated relative position of the selected RF AP to determine the direction in which to place its beam. Typically this would involve placing the beam in the direction of the LoS path between the STA and the selected RF AP. Further, the STA may also use the relative positions of the other RF APs to place nulls in the directions of the other RF APs. Having established the RF link, the RF link can be used for UL transmissions and/or DL transmissions.

On the network side, once the serving LC AP identifies the connection loss, it may notify at least those RF APs which are relevant candidates for the establishment of the RF link to the STA, e.g., those RF APs which according to the LC positioning information are estimated to be within a certain range from the STA. A selection of the RF AP to which the RF link is to be established may also be performed on the network side, e.g., by the LC AP which lost the LC connection. Also here, the selection could be based on priority information indicating, for each LC AP, which RF APs are to be preferred for establishment of an RF link if the LC connection to this LC AP is lost.

Since the RF APs are typically static and/or provided with one or more sensors for measurement of the RF AP's orientation, the RF AP selected for establishment of the RF link may use the LC positioning information and its orientation to determine the direction in which to place its beam for the RF link to the STA. Typically this would involve placing the beam in the direction of the LoS path between the RF AP and the STA. The other RF APs may in turn use the LC positioning information and their respective orientation to determine a direction in which to place a nulls.

Now considering the use case involving concurrent LC and RF communication between on the one hand an LC AP and a STA and on the other hand between one or more RF APs and this STA. This may also be referred to as multi-link hybrid connectivity and may have the purpose of increasing performance or the QoS level achievable for the STA. In some case, the multi-link hybrid connectivity may also be used for decoupling the UL and DL communication directions. For example, LC could be used for the DL communication direction while RF communication is used for the UL communication direction. Further, the multi-link hybrid connectivity may also be used for assigning different communication services to separate links, e.g., by providing one or more communication services via one or more LC links and providing one or more other communication services via one or more RF links. In such scenarios, due to the existing LC link, the LC positioning information may be used to select one or more RF APs to serve the STA, and these one or more RF APs and the STA may also use the LC positioning information to control placement of their respective beams and nulls, using the above-described principles.

Now considering the use case involving a mobile STA that is connected both to an LC AP and one or more RF APs, it can be assumed that at a given time both the STA and the one or more RF APs have properly placed their beams and nulls, e.g., using the above-described principles. However, due to the mobility of the STA, the placement of these beams and nulls may need to be updated, e.g., when the STA moves from the coverage area of one LC AP to the coverage area of another LC AP. This may also be regarded as a handover of the STA from its serving LC AP to another LC AP. After such handover, the LC positioning information may be used to update the relevant RF APs about the new position of the STA. Consequently, the RF APs can adjust the placement of their beams and nulls. In a similar manner, also the STA can update the placement of its beam(s) and nulls based on the updated LC positioning information.

It is noted that in some scenarios, it may also occur that an attempt to establish an RF link between an RF AP and a STA is not successful or the performance of the established RF link, e.g., in terms of achievable QoS level, turns out to be insufficient. This may for example happen in volatile environments, with highly mobile STAs or with frequently changing conditions. In such cases, the STA can utilize the above-described procedures to attempt establishment of an RF connection with another RF AP, e.g., the next RF AP according to a priority order for for establishment of an RF link to the STA.

As can be seen, the illustrated concepts may thus involve that in the beam-pattern synthesis at the transmitter side, the placement of the beams, i.e., main lobes, in the intended transmitting direction and/or the placement of nulls in the directions where interference is required to be minimized/eliminated is at least in part based on LC positioning information indicating the positions of one or more of the STAs. The positions of the RF APs may be defined by preconfigured information or may be learned from earlier RF measurements.

Further, the orientation of the involved nodes may be defined by preconfigured information or learned from sensor measurements. In a similar manner, the beam-pattern synthesis at the receiver side may involve that the placement of the beams, i.e., main lobes, in the direction of the useful signal and/or the placement of nulls in the direction of interfering signals is at least in part based on LC positioning information. In some scenarios, the LC positioning information may be based on consideration to which LC AP a STA is connected or associated. Further, the LC positioning information may be based on LC signals transmitted between the respective STA and one or more LC APs, e.g., LC signals carrying data or LC beacons used in initial access of the STA to the hybrid LC/RF wireless communication network. In particular, such LC beacons could be used to select the LC AP to which the STA is to be associated or connected.

In some scenarios, the LC positioning information may be supplemented by information obtained from RF measurements and/or by historical. Such RF measurements may be used to obtain additional positioning information indicating the position of one or more STAs, or may be used to directly control the placement of beams, e.g., for NLoS RF connections.

In some scenarios, when the initial beam-pattern synthesis does not provide the required performance or QoS level, e.g., measured in terms of spectral efficiency or some other metric, the beam pattern synthesis may be repeated based on additionally or alternatively considering information from RF measurements or historical data.

In some scenarios, the possibility of utilizing both LoS RF links and NLoS RF links may be accommodated. This may involve placing the beams and nulls for the LoS RF links based on the LC positioning information and the placing the beams, and optionally also nulls, for the NLoS RF links based on information from RF measurements or historical data. Alternatively, the nulls for the NLoS RF links could be placed based on the LC positioning information.

In some scenarios, a new RF link to a STA may be established in response to a loss of an LC link to the STA, utilizing the above-described procedures based on the LC positioning information.

In some scenarios, a STA may concurrently maintain an LC link and one or more RF links, and the one or more RF links may be established or controlled utilizing the above-described procedures based on the LC positioning information.

In some scenarios, a mobile STA may move from the coverage area of one LC AP to the coverage area of another LC AP and concurrently maintain one or more RF links for communication with the hybrid LC/RF wireless communication network.

In some scenarios, the LC positioning information may be used to provide an initial estimate of the position of the STA, and be used as input to other positioning methods, e.g., based on RF measurements and/or measurements based on LC signals.

In some scenarios, one or more backhaul links between the APs may be used for distributing the LC positioning information. The backhaul links may be wired or wireless.

The beamformed RF transmissions using the synthesized beam pattern may be based on adjusting only the phase of the transmitted/received signal or both the phase and amplitude of the transmitted/received signal.

The beamformed RF transmissions using the synthesized beam pattern may include DL RF transmissions, UL RF transmissions, or both DL and UL RF transmissions.

Figure 5:
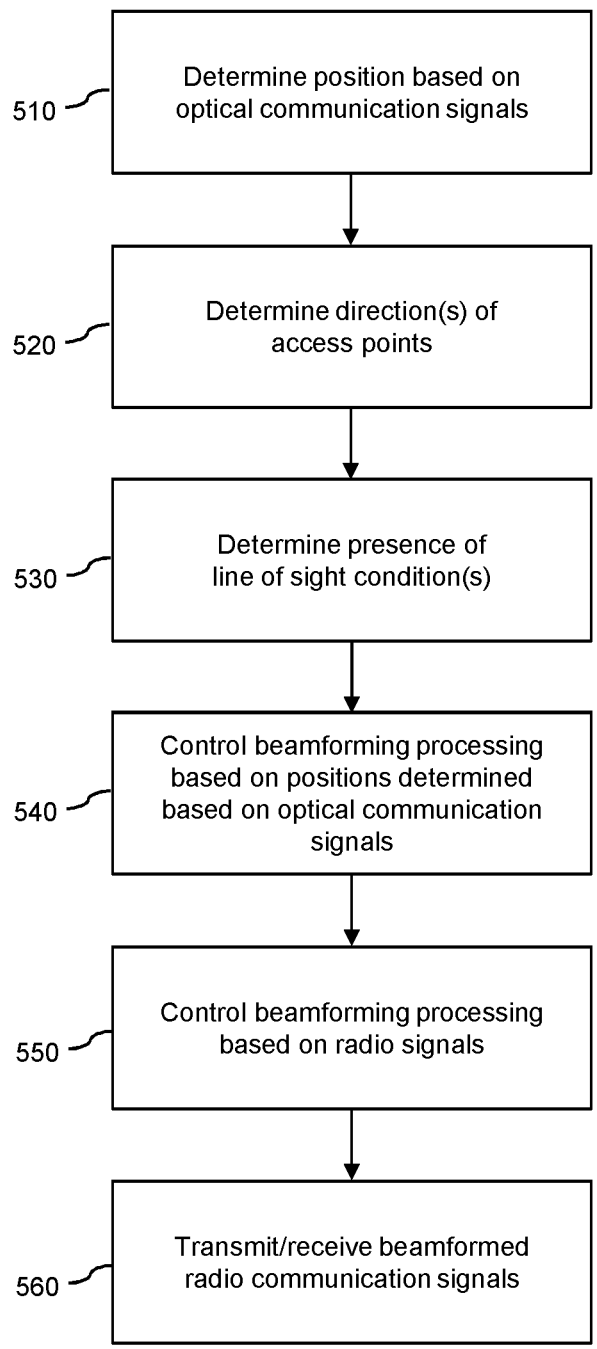
FIG. 5 shows a flowchart for schematically illustrating a method according to an embodiment.

FIG. 5 shows a flowchart for illustrating a method, which may be utilized for implementing the illustrated concepts. The method of FIG. 5 may be used for implementing the illustrated concepts in a wireless device, such as one or the above-mentioned STAs 11, operated in a wireless communication network. The wireless communication network may for example be based on combination of a wireless optical communication technology and a Wireless Local Area Network technology according to the IEEE 802.11 standards family.

The wireless communication network includes one or more first APs and one or more second APs. The first APs support communication on the basis of radio signals. The second APs support communication on the basis of radio signals. The first APs may for example correspond to the above-mentioned LC APs among the APs 10. The second APs may for example correspond to the above-mentioned RF APs among the APs 10. In some scenarios, the one or more first APs and the one or more second APs may include one or more APs supporting communication on the basis of radio signals and on the basis of optical communication signals, such as explained above for AP 5.

If a processor-based implementation of the wireless device is used, at least some of the steps of the method of FIG. 5 may be performed and/or controlled by one or more processors of the wireless device. Such wireless device may also include a memory storing program code for implementing at least some of the below described functionalities or steps of the method of FIG. 5.

At step 510, the wireless device determines a position of the wireless device based on an optical communication signal transmitted between the wireless device and one or more first APs of the wireless communication network. In some scenarios, the wireless device may determine the position based on its association to one of the first APs, with the association in turn being based on optical communication signals transmitted between the wireless device and one or more of the first APs. In some scenarios, the wireless device may determine the position directly from optical communication signal transmitted between the wireless device and one or more first APs. In some scenarios, the wireless device may determine the position of the wireless device based on signal strengths or signal quality of the optical communication signals, e.g., measured in terms of SNR or SINR.

The optical communication signals may include optical communication signals transmitted in a DL downlink direction from the one or more first APs to the wireless device.

At step 520, the wireless device may determine, for at least one of the one or more second APs, a respective direction from the wireless device to the AP. Specifically, the wireless device may determine the respective direction based on the position of the wireless device as determined at step 510.

At step 530, the wireless device may determine the presence of LoS conditions between the wireless device and the one or more second APs. For example, the wireless device may determine the presence of such LoS conditions from radio signals transmitted between the wireless device and the one or more second APs, e.g., by considering the performance of a radio link between the wireless communication device and the respective second AP.

At step 540, the wireless device controls beamforming processing of radio communication signals transmitted between the wireless device and the one or more second APs of the wireless communication network. Specifically, the wireless device controls the beamforming processing based on the position determined at step 510.

The radio communication signals may include radio communication signals transmitted in a DL direction from the one or more second APs to the wireless device and/or radio communication signals transmitted in a UL direction from the wireless device to the one or more second APs.

In some scenarios, step 540 may involve that the wireless device controls the beamforming processing to place a radio beam in at least one of the directions determined at step 520. In addition or as an alternative, step 540 may involve that the wireless device controls the beamforming processing to place a beamforming null in at least one of the directions determined at step 520. In some scenarios, step 540 may involve that the wireless device controls the beamforming processing to place a radio beam in at least one of the directions determined at step 520 and to place a beamforming null in at least one of the other directions determined at step 520.

At step 550, the wireless device may also control the beamforming processing based on radio signals transmitted between the wireless device and the at least one of the one or more second APs, e.g., based on a beam-sweeping process and/or based on passive monitoring of received radio signals. For example, in response to not being able to determine the position of the wireless device based on the optical communication signals, the wireless device may control the beamforming processing based on radio signals transmitted between the wireless device and the at least one of the one or more second APs.

In some scenarios, the control of the beamforming processing may depends on presence of LoS conditions between the wireless device and the one or more second APs. For example, in response to determining that there is no LoS condition between the wireless device and at least one of the one or more second APs, the wireless device may control the beamforming processing based on radio signals transmitted between the wireless device and the at least one of the one or more second APs, e.g., based on a beam-sweeping process and/or based on passive monitoring of received radio signals.

At step 560, the wireless device may transmit and/or receive beamformed radio communication signals, for which the beamforming processing is controlled at step 540 and optionally at step 550.

Figure 6:
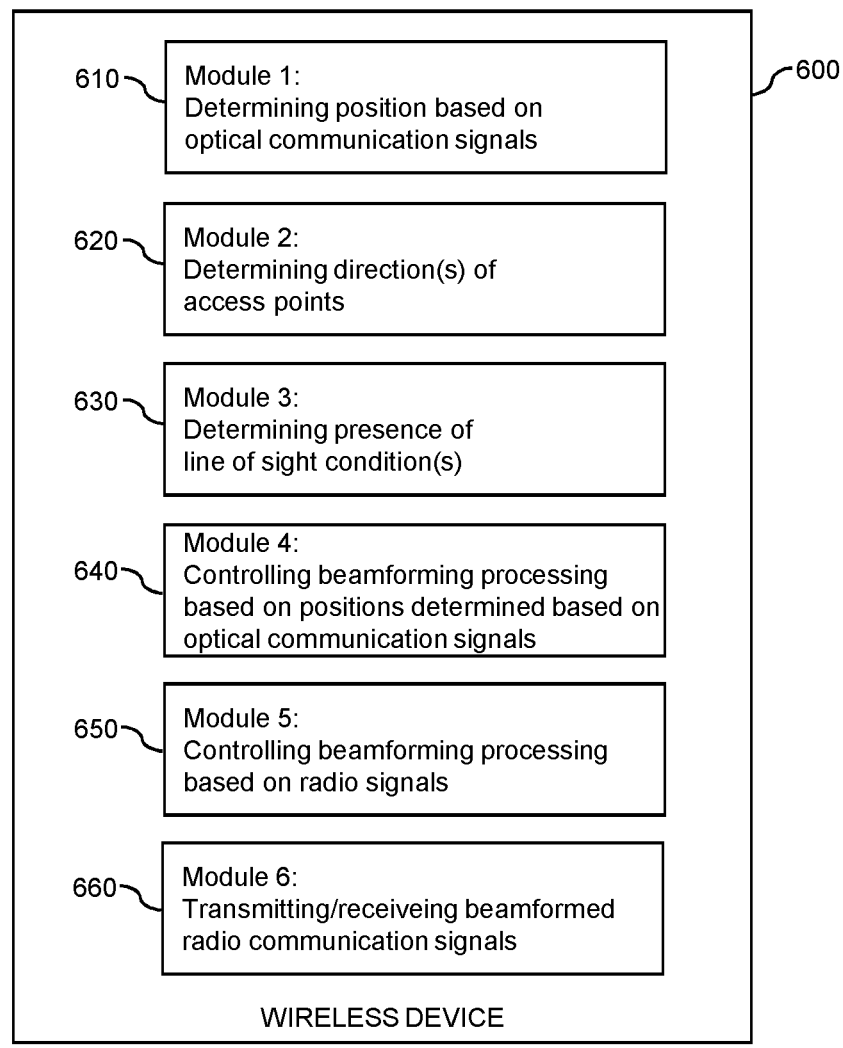
FIG. 6 shows a block diagram for schematically illustrating functionalities of a wireless device according to an embodiment.

FIG. 6 shows a block diagram for illustrating functionalities of a wireless device 600 which operates according to the method of FIG. 5. The wireless device 600 may for example correspond to one of above-mentioned STAs 11. As illustrated, the wireless device 600 may be provided with a module 610 configured to determine a position of the wireless device based on optical communication signals, such as explained in connection with step 510. Further, the wireless device 600 may be provided with a module 620 configured to determine direction of APs, such as explained in connection with step 520. Further, the wireless device 600 may be provided with a module 630 configured to determine the presence of LoS conditions, such as explained in connection with step 530. Further, the wireless device 600 may be provided with a module 640 configured to control beamforming processing based on the position determined from optical communication signals, such as explained in connection with step 540. Further, the wireless device 600 may be provided with a module 650 configured to configured to control beamforming processing based on radio communication signals, such as explained in connection with step 550. Further, the wireless device 600 may be provided with a module 660 configured to transmit and/or receive beamformed radio communication signals, such as explained in connection with step 560.

It is noted that the wireless device 600 may include further modules for implementing other functionalities, such as known functionalities of a non-AP STA of a WLAN technology. Further, it is noted that the modules of the wireless device 600 do not necessarily represent a hardware structure of the wireless device 600, but may also correspond to functional elements, e.g., implemented by hardware, software, or a combination thereof.

Figure 7:
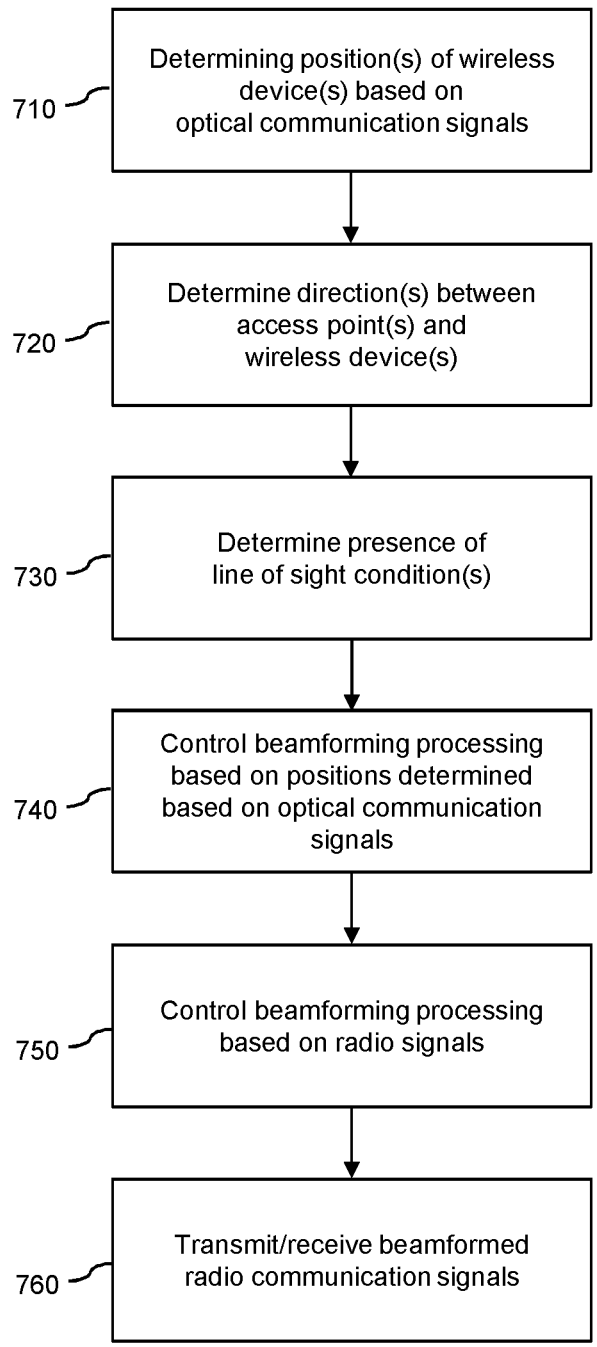
FIG. 7 shows a flowchart for schematically illustrating a further method according to an embodiment.

FIG. 7 shows a flowchart for illustrating a method, which may be utilized for implementing the illustrated concepts. The method of FIG. 7 may be used for implementing the illustrated concepts in an AP of a wireless communication network, such as one or the above-mentioned APs 10. The wireless communication network may for example be based on combination of a wireless optical communication technology and a Wireless Local Area Network technology according to the IEEE 802.11 standards family.

The wireless communication network includes one or more first APs and one or more second APs. The first APs support communication on the basis of radio signals. The second APs support communication on the basis of radio signals. The first APs may for example correspond to the above-mentioned LC APs among the APs 10. The second APs may for example correspond to the above-mentioned RF APs among the APs 10. In some scenarios, the one or more first APs and the one or more second APs may include one or more APs supporting communication on the basis of radio signals and on the basis of optical communication signals, such as explained above for AP 5. The AP performing the method of FIG. 7 may be one of the first APs and/or one of the second APs.

If a processor-based implementation of the AP is used, at least some of the steps of the method of FIG. 7 may be performed and/or controlled by one or more processors of the AP. Such AP may also include a memory storing program code for implementing at least some of the below described functionalities or steps of the method of FIG. 7.

At step 710, the AP determines, for each of one or more wireless devices, a position of the wireless device based on an optical communication signal transmitted between the wireless device and one or more first APs of the wireless communication network. In some scenarios, the AP may determine the position of the wireless device based on its association to one of the first APs, with the association in turn being based on optical communication signals transmitted between the wireless device and one or more of the first APs. In some scenarios, the position may be determined directly from optical communication signals transmitted between the wireless device and one or more first APs. In some scenarios, the position of the wireless device may then be determined based on signal strengths of the optical communication signals. The signal strengths could for example be measured in terms of SINR.

If the AP itself is not involved in the transmission of the optical signals between the first APs and the wireless device, the AP may determine the position based on one or more reports received from the wireless device and/or from one or more of the first APs. Such reports may include information on detection of at least some of the optical communication signals.

The optical communication signals may include optical communication signals transmitted in a DL downlink direction from the one or more first APs to the wireless device.

At step 720, the AP may determine, for each of the one or more second APs and at least one of the one or more wireless devices, a respective direction from the second AP to the wireless device. Specifically, the AP may determine the respective direction based on the position of the wireless device as determined at step 710.

At step 730, the AP may determine the presence of LoS conditions between the wireless device and the one or more second APs. For example, the AP may determine the presence of such LoS conditions from radio signals transmitted between the wireless device and the one or more second APs, e.g., by considering the performance of a radio link between the wireless communication device and the respective second AP.

At step 740, the AP controls beamforming processing of radio communication signals transmitted between the one or more wireless devices and the one or more second APs of the wireless communication network. Specifically, the AP controls the beamforming processing based on the one or more positions determined at step 710.

The radio communication signals may include radio communication signals transmitted in a DL direction from the one or more second APs to the wireless device and/or radio communication signals transmitted in a UL direction from the wireless device to the one or more second APs.

In some scenarios, step 740 may involve that the AP controls the beamforming processing to place a radio beam in at least one of the directions determined at step 720. In addition or as an alternative, step 740 may involve that the AP controls the beamforming processing to place a beamforming null in at least one of the directions determined at step 720. In some scenarios, step 740 may involve that the AP controls the beamforming processing to place a radio beam in at least one of the directions determined at step 720 and to place a beamforming null in at least one of the other directions determined at step 720.

At step 750, the AP may also control the beamforming processing based on radio signals transmitted between the wireless device and the at least one of the one or more second APs, e.g., based on a beam-sweeping process and/or based on passive monitoring of received radio signals. For example, in response to not being able to determine the position of the wireless device based on the optical communication signals, the AP may control the beamforming processing based on radio signals transmitted between the wireless device and the at least one of the one or more second APs.

In some scenarios, the control of the beamforming processing may depends on presence of LoS conditions between the wireless device and the one or more second APs. For example, in response to determining that there is no LoS condition between the wireless device and at least one of the one or more second APs, the AP may control the beamforming processing based on radio signals transmitted between the wireless device and the at least one of the one or more second APs, e.g., based on a beam-sweeping process and/or based on passive monitoring of received radio signals.

If the AP itself is not involved in the transmission of the radio communication signals, the control of the beamforming processing may also involve providing control information to the at least one of the one or more second APs, e.g., by indicating a synthesized beam pattern.

If the AP itself is involved in the transmission of the radio communication signals, at step 760 the AP may transmit and/or receive beamformed radio communication signals, for which the beamforming processing is controlled at step 740 and optionally at 750.

Figure 8:
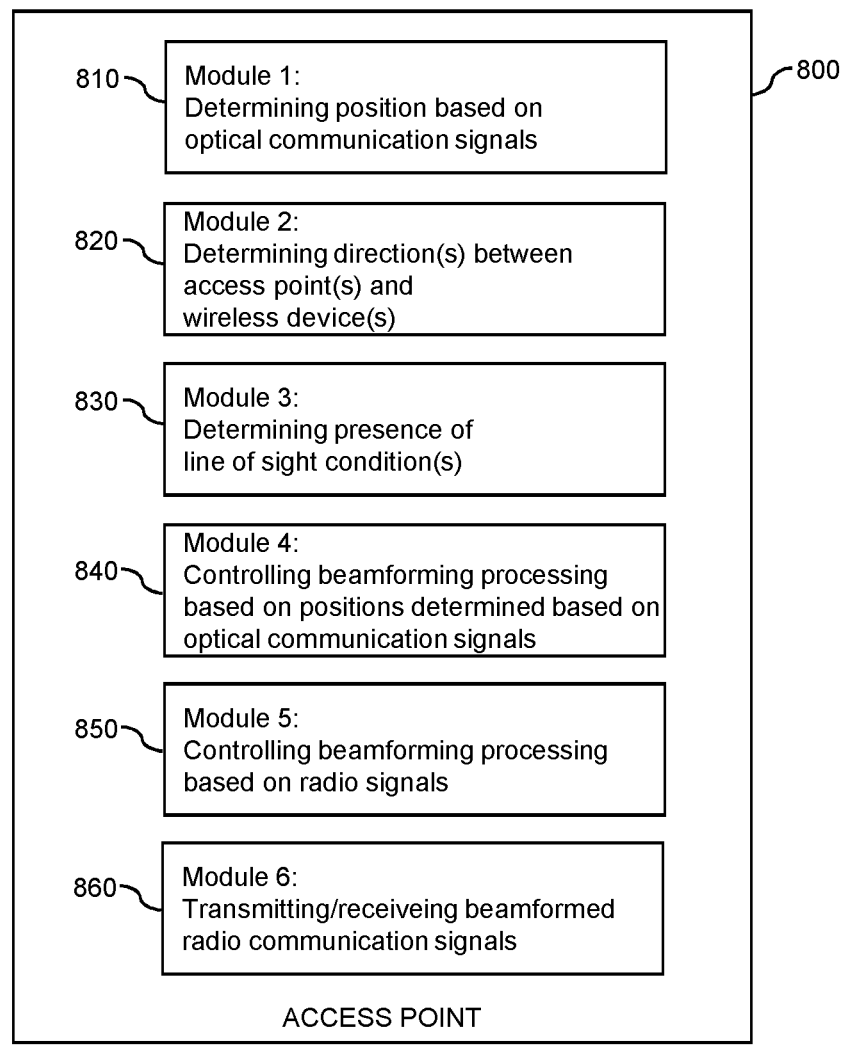
FIG. 8 shows a block diagram for schematically illustrating functionalities of an access point according to an embodiment.

FIG. 8 shows a block diagram for illustrating functionalities of an AP 800 which operates according to the method of FIG. 7. The AP 800 may for example correspond to one of the above-mentioned APs 10. As illustrated, the AP 800 may be provided with a module 810 configured to determine a position of a wireless device based on optical communication signals, such as explained in connection with step 710. Further, the AP 800 may be provided with a module 820 configured to determine directions between APs and wireless devices, such as explained in connection with step 720. Further, the AP 800 may be provided with a module 730 configured to determine the presence of LoS conditions, such as explained in connection with step 730. Further, the AP 800 may be provided with a module 840 configured to control beamforming processing based on the positions determined from optical communication signals, such as explained in connection with step 740. Further, the AP 800 may be provided with a module 750 configured to configured to control beamforming processing based on radio communication signals, such as explained in connection with step 750. Further, the AP 800 may be provided with a module 860 configured to transmit and/or receive beamformed radio communication signals, such as explained in connection with step 760.

It is noted that the AP 800 may include further modules for implementing other functionalities, such as known functionalities of an AP of a WLAN technology or of an LC technology. Further, it is noted that the modules of the AP 800 do not necessarily represent a hardware structure of the AP 800, but may also correspond to functional elements, e.g., implemented by hardware, software, or a combination thereof.

Figure 9:
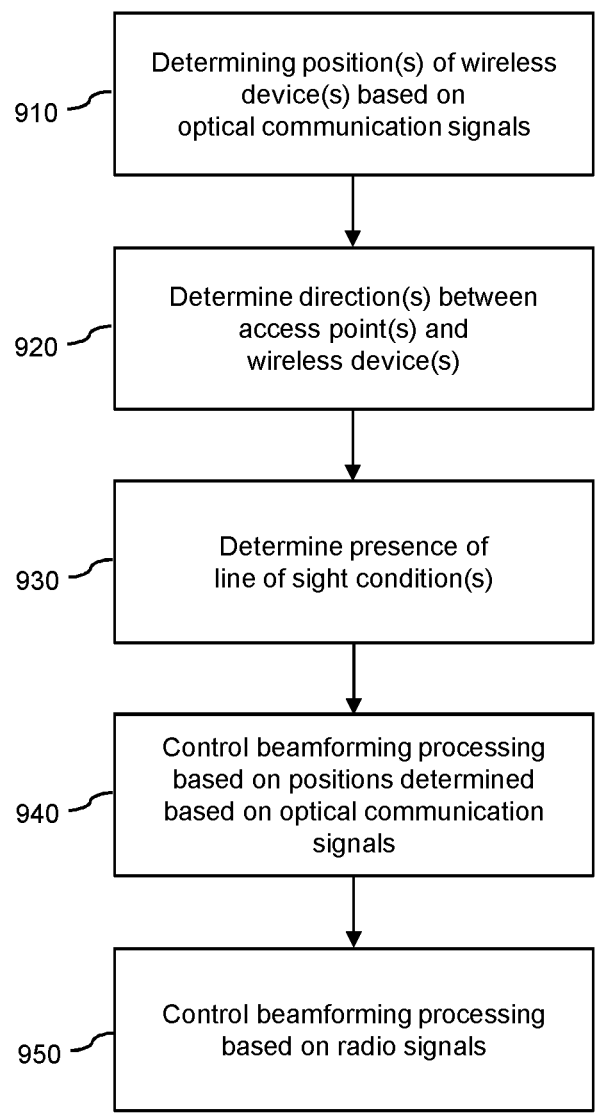
FIG. 9 shows a flowchart for schematically illustrating a further method according to an embodiment.

FIG. 9 shows a flowchart for illustrating a method, which may be utilized for implementing the illustrated concepts. The method of FIG. 9 may be used for implementing the illustrated concepts in a control node, such as the above-mentioned control node 100. The wireless communication network may for example be based on combination of a wireless optical communication technology and a Wireless Local Area Network technology according to the IEEE 802.11 standards family.

The wireless communication network includes one or more first APs and one or more second APs. The first APs support communication on the basis of radio signals. The second APs support communication on the basis of radio signals. The first APs may for example correspond to the above-mentioned LC APs among the APs 10. The second APs may for example correspond to the above-mentioned RF APs among the APs 10. In some scenarios, the one or more first APs and the one or more second APs may include one or more APs supporting communication on the basis of radio signals and on the basis of optical communication signals, such as explained above for AP 5.

If a processor-based implementation of the control node is used, at least some of the steps of the method of FIG. 9 may be performed and/or controlled by one or more processors of the control node. Such control node may also include a memory storing program code for implementing at least some of the below described functionalities or steps of the method of FIG. 9.

At step 910, the control node determines, for each of one or more wireless devices, a position of the wireless device based on an optical communication signal transmitted between the wireless device and one or more first APs of the wireless communication network. In some scenarios, the control node may determine the position of the wireless device based on its association to one of the first APs, with the association in turn being based on optical communication signals transmitted between the wireless device and one or more of the first APs. In some scenarios, the position may be determined directly from optical communication signals transmitted between the wireless device and one or more first APs. In some scenarios, the position of the wireless device may then be determined based on signal strengths of the optical communication signals. The signal strengths could for example be measured in terms of SINR. The control node may determine the position based on one or more reports received from the wireless device and/or from one or more of the first APs. Such reports may include information on detection of at least some of the optical communication signals.

The optical communication signals may include optical communication signals transmitted in a DL downlink direction from the one or more first APs to the wireless device.

At step 920, the control node may determine, for each of the one or more second APs and at least one of the one or more wireless devices, a respective direction from the second AP to the wireless device. Specifically, the control node may determine the respective direction based on the position of the wireless device as determined at step 910.

At step 930, the control node may determine the presence of LoS conditions between the wireless device and the one or more second APs. For example, the control node may determine the presence of such LoS conditions from radio signals transmitted between the wireless device and the one or more second APs, e.g., by considering the performance of a radio link between the wireless communication device and the respective second AP.

At step 940, the control node controls beamforming processing of radio communication signals transmitted between the one or more wireless devices and the one or more second APs of the wireless communication network. Specifically, the control node controls the beamforming processing based on the one or more positions determined at step 910.

The radio communication signals may include radio communication signals transmitted in a DL direction from the one or more second APs to the wireless device and/or radio communication signals transmitted in a UL direction from the wireless device to the one or more second APs.

In some scenarios, step 940 may involve that the control node controls the beamforming processing to place a radio beam in at least one of the directions determined at step 920. In addition or as an alternative, step 940 may involve that the control node controls the beamforming processing to place a beamforming null in at least one of the directions determined at step 920. In some scenarios, step 940 may involve that the control node controls the beamforming processing to place a radio beam in at least one of the directions determined at step 920 and to place a beamforming null in at least one of the other directions determined at step 920.

At step 950, the control node may also control the beamforming processing based on radio signals transmitted between the wireless device and the at least one of the one or more second APs, e.g., based on a beam-sweeping process and/or based on passive monitoring of received radio signals. For example, in response to not being able to determine the position of the wireless device based on the optical communication signals, the control node may control the beamforming processing based on radio signals transmitted between the wireless device and the at least one of the one or more second APs.

In some scenarios, the control of the beamforming processing may depends on presence of LoS conditions between the wireless device and the one or more second APs. For example, in response to determining that there is no LoS condition between the wireless device and at least one of the one or more second APs, the control node may control the beamforming processing based on radio signals transmitted between the wireless device and the at least one of the one or more second APs, e.g., based on a beam-sweeping process and/or based on passive monitoring of received radio signals.

The control of the beamforming processing may involve that the control node provides control information to the at least one of the one or more second APs, e.g., by indicating a synthesized beam pattern.

Figure 10:
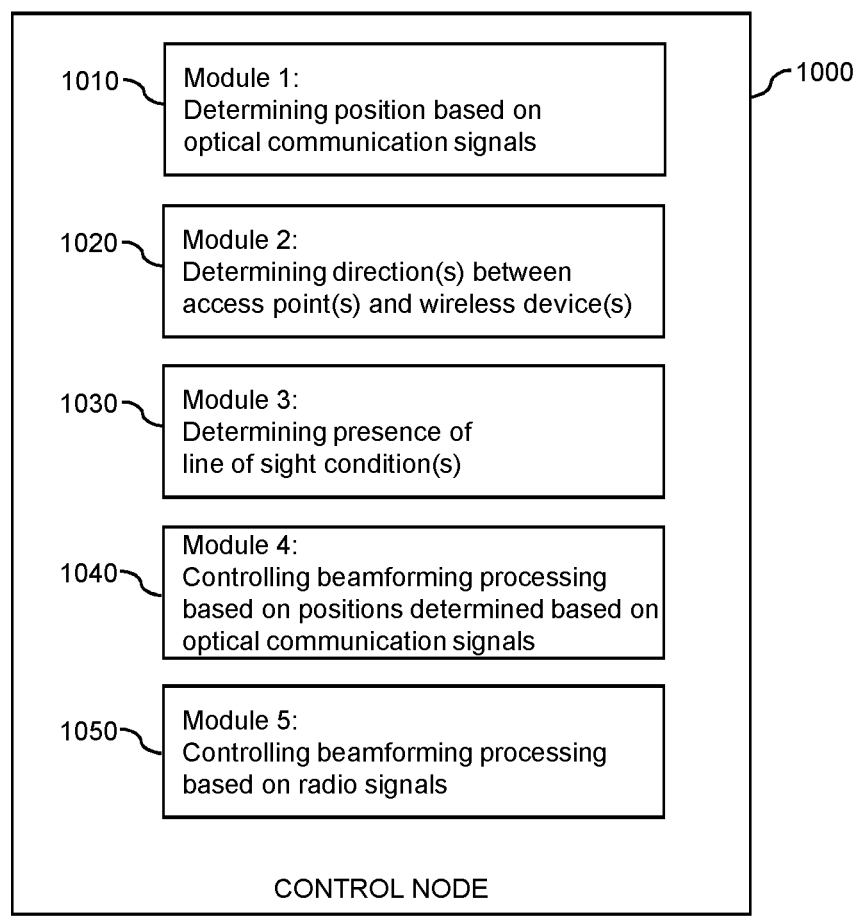
FIG. 10 shows a block diagram for schematically illustrating functionalities of a control node according to an embodiment.

FIG. 10 shows a block diagram for illustrating functionalities of a control node 1000 which operates according to the method of FIG. 9. The control node 1000 may for example correspond to the above-mentioned control node 100. As illustrated, the control node 1000 may be provided with a module 1010 configured to determine a position of a wireless device based on optical communication signals, such as explained in connection with step 910. Further, the control node 1000 may be provided with a module 1020 configured to determine directions between APs and wireless devices, such as explained in connection with step 920. Further, the control node 1000 may be provided with a module 1030 configured to determine the presence of LoS conditions, such as explained in connection with step 930. Further, the control node 1000 may be provided with a module 1040 configured to control beamforming processing based on the positions determined from optical communication signals, such as explained in connection with step 940. Further, the control node 1000 may be provided with a module 1050 configured to configured to control beamforming processing based on radio communication signals, such as explained in connection with step 950.

It is noted that the control node 1000 may include further modules for implementing other functionalities, such as known functionalities of a control node of a WLAN technology or of an LC technology. Further, it is noted that the modules of the control node 1000 do not necessarily represent a hardware structure of the control node 1000, but may also correspond to functional elements, e.g., implemented by hardware, software, or a combination thereof.

It is noted that the functionalities as described in connection with FIGS. 5 to 10 could also be implemented in a system, e.g., a system including one or more wireless devices operating according to the method of FIG. 5, and one or more APs operating according to the method of FIG. 7, and/or a control node operating according to the method of FIG. 9.

Figure 11:
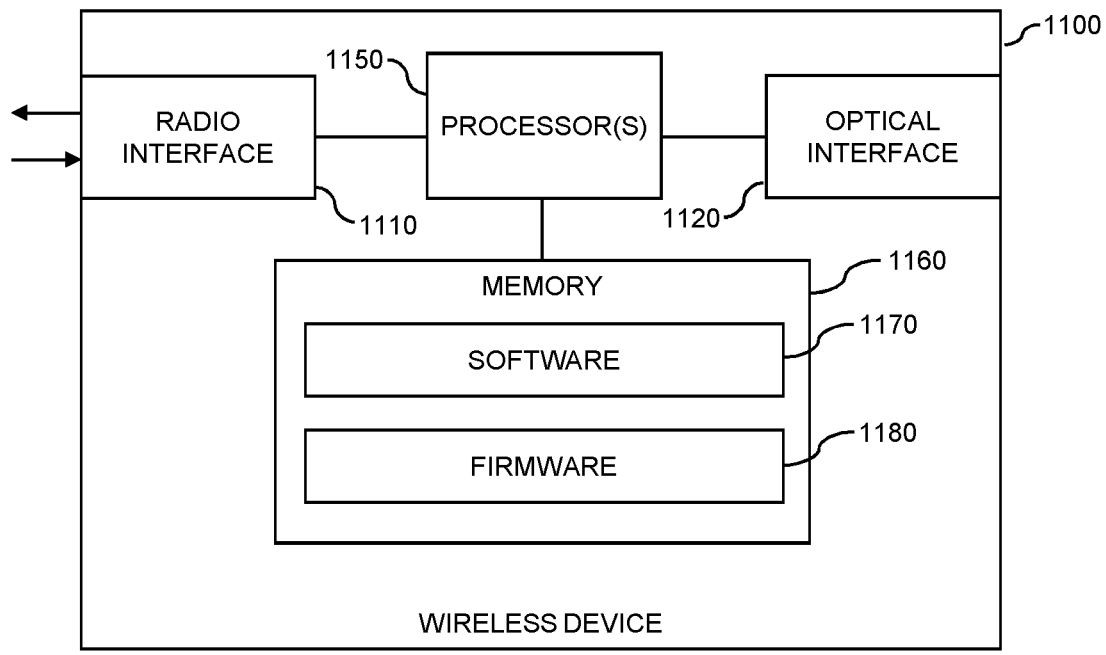
FIG. 11 schematically illustrates structures of a wireless device according to an embodiment.

FIG. 11 illustrates a processor-based implementation of a wireless device 1100. The structures as illustrated in FIG. 11 may be used for implementing the above-described concepts. The wireless device 1100 may for example correspond to one of above-mentioned mentioned STAs 11.

As illustrated, the wireless device 1100 includes one or more radio interfaces 1110. The radio interface(s) 1110 may for example be based on a WLAN technology, e.g., according to an IEEE 802.11 family standard. However, other radio technologies could be supported as well, e.g., the LTE technology or the NR technology. In some scenarios, the radio interface(s) 1110 may be based on multiple antennas of the wireless device 1100 and support beamformed radio transmissions. Further, the wireless device 1100 includes an optical interface 1120. The optical interface may for example be based on an LC technology, e.g., operating in the visible and/or infrared spectrum.

Further, the wireless device 1100 includes one or more processors 1150 coupled to the radio interface(s) 1110 and a memory 1160 coupled to the processor(s) 1150. By way of example, the radio interface(s) 1110, the optical interface 1120, the processor(s) 1150, and the memory 1160 could be coupled by one or more internal bus systems of the wireless device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling wireless transmissions, such as explained in connection with FIG. 5.

It is to be understood that the structures as illustrated in FIG. 11 are merely schematic and that the wireless device 1100 may actually include further components which, for the sake of clarity, have not been illustrated, e.g., further interfaces or further processors. Also, it is to be understood that the memory 1160 may include further program code for implementing known functionalities of a WLAN STA or LC device. According to some embodiments, also a computer program may be provided for implementing functionalities of the wireless device 1100, e.g., in the form of a physical medium storing the program code and/or other data to be stored in the memory 1160 or by making the program code available for download or by streaming.

FIG. 10 shows a block diagram for illustrating functionalities of a control node 1000 which operates according to the method of FIG. 9. The control node 1000 may for example correspond to the above-mentioned control node 100. As illustrated, the control node 1000 may be provided with a module 1010 configured to determine a position of a wireless device based on optical communication signals, such as explained in connection with step 910. Further, the control node 1000 may be provided with a module 1020 configured to determine directions between APs and wireless devices, such as explained in connection with step 920. Further, the control node 1000 may be provided with a module 1030 configured to determine the presence of LoS conditions, such as explained in connection with step 930. Further, the control node 1000 may be provided with a module 1040 configured to control beamforming processing based on the positions determined from optical communication signals, such as explained in connection with step 940. Further, the control node 1000 may be provided with a module 1050 configured to configured to control beamforming processing based on radio communication signals, such as explained in connection with step 950.

It is noted that the control node 1000 may include further modules for implementing other functionalities, such as known functionalities of a control node of a WLAN technology or of an LC technology. Further, it is noted that the modules of the control node 1000 do not necessarily represent a hardware structure of the control node 1000, but may also correspond to functional elements, e.g., implemented by hardware, software, or a combination thereof.

It is noted that the functionalities as described in connection with FIGS. 5 to 10 could also be implemented in a system, e.g., a system including one or more wireless devices operating according to the method of FIG. 5, and one or more APs operating according to the method of FIG. 7, and/or a control node operating according to the method of FIG. 9.

FIG. 11 illustrates a processor-based implementation of a wireless device 1100. The structures as illustrated in FIG. 11 may be used for implementing the above-described concepts. The wireless device 1100 may for example correspond to one of the above-mentioned mentioned STAs 11.

As illustrated, the wireless device 1100 includes one or more radio interfaces 1110. The radio interface(s) 1110 may for example be based on a WLAN technology, e.g., according to an IEEE 802.11 family standard. However, other radio technologies could be supported as well, e.g., the LTE technology or the NR technology. In some scenarios, the radio interface(s) 1110 may be based on multiple antennas of the wireless device 1100 and support beamformed radio transmissions. Further, the wireless device 1100 includes an optical interface 1120. The optical interface may for example be based on an LC technology, e.g., operating in the visible and/or infrared spectrum.

Further, the wireless device 1100 includes one or more processors 1150 coupled to the radio interface(s) 1110 and/or optical interface 1120, and a memory 1160 coupled to the processor(s) 1150. By way of example, the radio interface(s) 1110, the optical interface 1120, the processor(s) 1150, and the memory 1160 could be coupled by one or more internal bus systems of the wireless device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling wireless transmissions, such as explained in connection with FIG. 5.

It is to be understood that the structures as illustrated in FIG. 11 are merely schematic and that the wireless device 1100 may actually include further components which, for the sake of clarity, have not been illustrated, e.g., further interfaces or further processors. Also, it is to be understood that the memory 1160 may include further program code for implementing known functionalities of a WLAN STA or LC device. According to some embodiments, also a computer program may be provided for implementing functionalities of the wireless device 1100, e.g., in the form of a physical medium storing the program code and/or other data to be stored in the memory 1160 or by making the program code available for download or by streaming.

Figure 12:
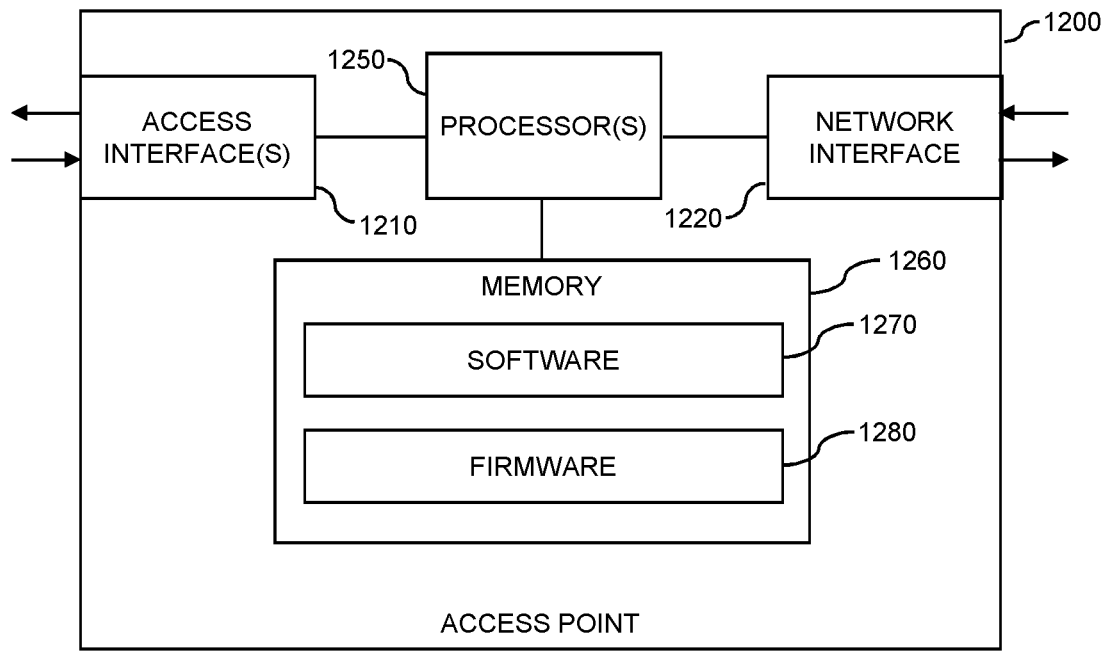
FIG. 12 schematically illustrates structures of an access point according to an embodiment.

FIG. 12 illustrates a processor-based implementation of an AP 1200. The structures as illustrated in FIG. 12 may be used for implementing the above-described concepts. The AP 1200 may for example correspond to one of the above-mentioned mentioned APs 10.

As illustrated, the AP 1200 includes one or more access interfaces 1210. The access interface(s) 1210 may include a radio interface, for example be based on a WLAN technology, e.g., according to an IEEE 802.11 family standard, and/or on other radio technologies, such as the LTE technology or the NR technology. The radio interface(s) may be based on multiple antennas of the AP 1200 and support beamformed radio transmissions. In addition or as an alternative, the access interface(s) may include an optical interface. The optical interface may for example be based on an LC technology, e.g., operating in the visible and/or infrared spectrum. Further, the AP 1200 includes a network interface 1220, for enabling connectivity to other nodes of a wireless communication network, e.g., to establish a backhaul link to other APs.

Further, the AP 1200 includes one or more processors 1250 coupled to the access interface(s) 1210 and network interface 1220, and a memory 1260 coupled to the processor(s) 1250. By way of example, the access interface(s) 1210, the network interface 1220, the processor(s) 1250, and the memory 1260 could be coupled by one or more internal bus systems of the AP 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling wireless transmissions, such as explained in connection with FIG. 7.

It is to be understood that the structures as illustrated in FIG. 12 are merely schematic and that the AP 1200 may actually include further components which, for the sake of clarity, have not been illustrated, e.g., further interfaces or further processors. Also, it is to be understood that the memory 1260 may include further program code for implementing known functionalities of a WLAN AP or LC AP. According to some embodiments, also a computer program may be provided for implementing functionalities of the AP 1200, e.g., in the form of a physical medium storing the program code and/or other data to be stored in the memory 1260 or by making the program code available for download or by streaming.

Figure 13:
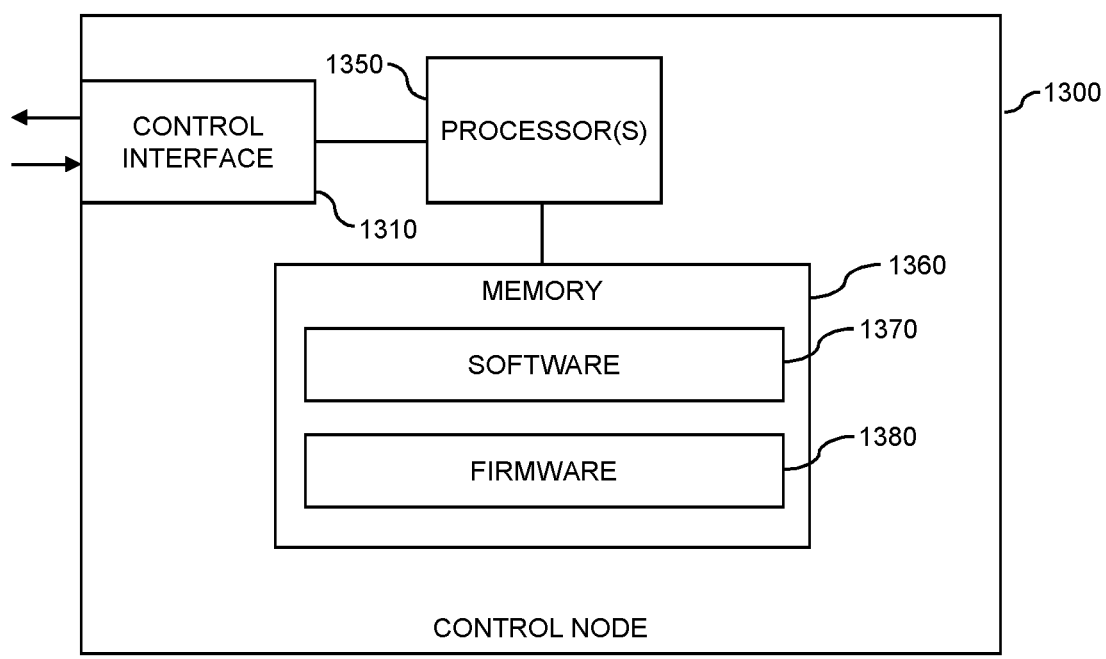
FIG. 13 schematically illustrates structures of a control node according to an embodiment.

FIG. 13 illustrates a processor-based implementation of a control node 1300. The structures as illustrated in FIG. 13 may be used for implementing the above-described concepts. The control node 1300 may for example correspond to the above-mentioned mentioned control node 100.

As illustrated, the control node 1300 includes a control interfaces 1310. The control interface 1310 may be used for communication with one or more APs of a wireless communication network, with the purpose of controlling wireless transmissions to or for these APs. The APs may support wireless communication based on a radio technology, such as a WLAN technology, e.g., according to an IEEE 802.11 family standard, and/or on other radio technologies, such as the LTE technology or the NR technology. Further, the APs may support wireless communication based on optical signals such as an LC technology, e.g., operating in the visible and/or infrared spectrum.

Further, the control node 1300 includes one or more processors 1350 coupled to the control interface 1310 and a memory 1360 coupled to the processor(s) 1350. By way of example, the control interface 1310, the processor(s) 1350, and the memory 1360 could be coupled by one or more internal bus systems of the control node 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370 and/or firmware 1380. The memory 1360 may include suitably configured program code to be executed by the processor(s) 1350 so as to implement the above-described functionalities for controlling wireless transmissions, such as explained in connection with FIG. 9.

It is to be understood that the structures as illustrated in FIG. 13 are merely schematic and that the control node 1300 may actually include further components which, for the sake of clarity, have not been illustrated, e.g., further interfaces or further processors. Also, it is to be understood that the memory 1360 may include further program code for implementing known functionalities of a control node for WLAN or LC technologies. According to some embodiments, also a computer program may be provided for implementing functionalities of the control node 1300, e.g., in the form of a physical medium storing the program code and/or other data to be stored in the memory 1360 or by making the program code available for download or by streaming.

As can be seen, the concepts as described above may be used for efficiently controlling wireless communication in a hybrid wireless communication network utilizing both radio communication and optical communication. Specifically, positioning information gathered from the optical part of the wireless communication network can be efficiently used to control beamforming processing of radio signals used in the radio part of the wireless communication network. This allows for an efficient and accurate placement of beams and nulls, without requiring an excessive amount of radio measurements. Further, the information from the optical part of the wireless communication network may allow for a quick and immediate control of the beamforming processing, because lengthy radio measurement periods can be avoided.

It is to be understood that the examples and embodiments as explained above are merely illustrative and susceptible to various modifications. For example, the illustrated concepts may be applied in connection with various kinds of radio communication technologies and optical communication technologies, without limitation to WLAN technologies and LC technologies.

Further, the concepts may be applied with respect to various types of APs and wireless devices. Further, the above-described functionalities may be distributed in various ways among the above described entities, i.e., the STAs, the APs, and the control node. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling radio communication in a wireless communication network, the method comprising:
   a wireless device determining a position of the wireless device based on an optical communication signal transmitted between the wireless device and one or more first access points of the wireless communication network; and
   based on the determined position, the wireless device controlling beamforming processing of radio communication signals transmitted between the wireless device and one or more second access points of the wireless communication network.

2. The method according to claim 1, comprising, for at least one of the one or more second access points, the wireless device determining based on the position of the wireless device a respective direction from the wireless device to the access point.

3. The method according to claim 2, comprising:
   the wireless device controlling the beamforming processing to place a radio beam in at least one of the determined directions; and/or
   the wireless device controlling the beamforming processing to place a beamforming null in at least one of the determined directions.

4. The method according to claim 1, wherein the one or more first access points and the one or more second access points include one or more access points supporting communication on the basis of radio signals and on the basis of optical communication signals.

5. The method according to claim 4, comprising the wireless device determining the position of the wireless device based on signal strengths of the optical communication signals.

6. The method according to claim 1, wherein the control of the beamforming processing depends on presence of line-of-sight conditions between the wireless device and the one or more second access points, and wherein the wireless device controlling the beamforming processing based on radio signals transmitted between the wireless device and the at least one of the one or more second access points is performed in response to determining that there is no line-of-sight condition between the wireless device and at least one of the one or more second access points.

7. The method according to claim 1, wherein the wireless communication network is based on combination of a wireless optical communication technology and a Wireless Local Area Network technology according to the IEEE 802.11 standards family.

8. A method of controlling radio communication in a wireless communication network, the method comprising:
   for each of one or more wireless devices, a node of the wireless communication network determining a position of the wireless device based on an optical communication signal transmitted between the wireless device and one or more first access points of the wireless communication network; and
   based on the determined one or more positions, the node controlling beamforming processing of radio communication signals transmitted between the one or more wireless devices and one or more second access points of the wireless communication network.

9. The method according to claim 8, comprising, for each of the one or more second access points and at least one of the one or more wireless devices, the node determining based on the position of the wireless device a direction from the second access point to the wireless device.

10. The method according to claim 9, comprising:
    the node controlling the beamforming processing to place a radio beam in at least one of the determined directions; and/or
    the node controlling the beamforming processing to place a beamforming null in at least one of the determined directions.

11. A wireless device for operation in a wireless communication network comprising a plurality of access points, the wireless device comprising:
    at least one processor, and
    a memory containing program code executable by the at least one processor whereby execution of the program code by the at least one processor causes the wireless device to:
       determine a position of the wireless device based on an optical communication signal transmitted between the wireless device and one or more first access points; and
       based on the determined position, control beamforming processing of radio communication signals transmitted between the wireless device and one or more second access points of the wireless communication network.

12. The wireless device according to claim 11, the memory containing program code executable by the at least one processor whereby execution of the program code by the at least one processor causes the wireless device to, for at least one of the one or more second access points, determine based on the position of the wireless device a respective direction from the wireless device to the access point.

13. The wireless device according to claim 12, the memory containing program code executable by the at least one processor whereby execution of the program code by the at least one processor causes the wireless device to:
    control the beamforming processing to place a radio beam in at least one of the determined directions; and/or
    control the beamforming processing to place a beamforming null in at least one of the determined directions.

14. The wireless device according to claim 11, wherein the one or more first access points and the one or more second access points include one or more access points supporting communication on the basis of radio signals and on the basis of optical communication signals.

15. The wireless device according to claim 14, the memory containing program code executable by the at least one processor whereby execution of the program code by the at least one processor causes the wireless device to determine the position of the wireless device based on signal strengths of the optical communication signals.

16. The wireless device according to claim 11, wherein the control of the beamforming processing depends on presence of line-of-sight conditions between the wireless device and the one or more second access points, wherein the memory contains program code executable by the at least one processor whereby execution of the program code by the at least one processor causes the wireless device control the beamforming processing based on radio signals transmitted between the wireless device and the at least one of the one or more second access points in response to determining that there is no line-of-sight condition between the wireless device and at least one of the one or more second access points.

17. The wireless device according to claim 11, wherein the wireless communication network is based on combination of a wireless optical communication technology and a Wireless Local Area Network technology according to the IEEE 802.11 standards family.

18. A node for a wireless communication network, the node comprising:
- at least one processor, and
- a memory containing program code executable by the at least one processor whereby execution of the program code by the at least one processor causes the node to:
  - for each of one or more wireless devices, determine a position of the wireless device based on an optical communication signal transmitted between the wireless device and one or more first access points of the wireless communication network; and
  - based on the determined one or more positions, control beamforming processing of radio communication signals transmitted between at least one of the one or more wireless devices and one or more second access points of the wireless communication network.

19. The node according to claim 18, the memory containing program code executable by the at least one processor whereby execution of the program code by the at least one processor causes the node to, for each of the one or more second access points and at least one of the one or more wireless devices, determine based on the position of the wireless device a direction from the second access point to the wireless device.

20. The node according to claim 19, the memory containing program code executable by the at least one processor whereby execution of the program code by the at least one processor causes the node to:
- control the beamforming processing to place a radio beam in at least one of the determined directions; and/or
- control the beamforming processing to place a beamforming null in at least one of the determined directions.

* * * * *